(12) United States Patent
Litwiller et al.

(10) Patent No.: US 7,831,665 B2
(45) Date of Patent: Nov. 9, 2010

(54) ELECTRONIC MAIL BEHAVIOR WITH A MULTI-FUNCTION MACHINE

(75) Inventors: Debora Margaret Hejza Litwiller, Rochester, NY (US); John C. McCarthy, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 437 days.

(21) Appl. No.: 11/363,599

(22) Filed: Feb. 28, 2006

(65) Prior Publication Data

US 2006/0248153 A1 Nov. 2, 2006

Related U.S. Application Data

(60) Provisional application No. 60/676,702, filed on May 2, 2005.

(51) Int. Cl.
*G06F 15/16* (2006.01)
(52) U.S. Cl. ...................................... 709/205
(58) Field of Classification Search ........................ None
See application file for complete search history.

(56) References Cited

U.S. PATENT DOCUMENTS

| | | | |
|---|---|---|---|
| 6,577,907 B1 * | 6/2003 | Czyszczewski et al. | 700/17 |
| 6,614,551 B1 * | 9/2003 | Peek | 358/1.15 |
| 6,880,091 B1 * | 4/2005 | Mattis et al. | 726/5 |
| 6,912,126 B2 * | 6/2005 | Rudd et al. | 361/686 |
| 7,353,034 B2 * | 4/2008 | Haney | 455/457 |
| 2003/0084050 A1 * | 5/2003 | Hall et al. | 707/10 |
| 2003/0164989 A1 * | 9/2003 | Yajima | 358/402 |
| 2005/0012965 A1 * | 1/2005 | Bloomfield | 358/402 |
| 2005/0065935 A1 * | 3/2005 | Chebolu et al. | 707/9 |
| 2005/0108530 A1 * | 5/2005 | Tonegawa | 713/170 |
| 2006/0129592 A1 * | 6/2006 | Poozhiyil et al. | 707/102 |

* cited by examiner

*Primary Examiner*—Ario Etienne
*Assistant Examiner*—Clayton R Williams
(74) *Attorney, Agent, or Firm*—Fay Sharpe LLP

(57) ABSTRACT

In accordance with one aspect of the present exemplary embodiment, a multifunction communication system comprises a scanner and a multifunction device that processes data received from the scanner. The multifunction device comprises a user interface that allows a user to enter commands to configure at least one functional aspect of the multifunction device, wherein the user is presented with a logical progression of steps that inquire of the user information that is needed to complete an email function. An authentication component communicates with the user interface that requires a user to enter a valid username and password via the user interface to access specific functionality of the multifunction device. An email component facilitates sending one or more email messages that contain data received from the scanner. A receiving component that receives at least one email message from the multifunction device.

16 Claims, 21 Drawing Sheets

ELECTRONIC MAIL BEHAVIOR WITH A MULTI-FUNCTION MACHINE

This application claims the benefit of U.S. Provisional Application Ser. No. 60/676,702, filed on May 2, 2005.

BACKGROUND

The present application relates to electronic mail (email) systems and methods and more particularly to providing specific functionality relative to utilizing email with multifunction machines.

Conventional multifunction machines allow a user to perform a plurality of tasks with the use of a single component. Such multifunction machines can provide copying, scanning, faxing, printing, emailing and the like. In this manner, the user is able to duplicate documents, digitize documents, transmit documents to one or more users electronically, etc. In order to accomplish such a plurality of tasks, the user is often confronted with an interface that is not intuitive and therefore difficult to navigate.

The problem is exacerbated when a user interface contains little or no information relative to the task at hand. For example, typical user interfaces are 2-line LCD displays that contain a menu that a user must scroll in order to select an appropriate command. In such cases, one or more desired functions can be difficult to locate much less select for use. In other cases, the user interface (e.g., touch screen, etc.) presents the user with an overload of options such that determining the appropriate task selection can be difficult.

Conventional email applications often require users to authenticate themselves to provide access to functions and provide a level of individual identity security through the use of user IDs and passwords. Email functionality is often difficult to access and utilize. In conventional multifunction machines, the user may be forced to enter (via keystroke) an entire destination email address every time a scanned document is desired to be sent. In other instances, the user may have to specify the senders email as well as the destination address before a document can be emailed. Conventional multifunction machines do not provide convenient and intuitive functionality to utilize email features associated therewith.

The present exemplary embodiments contemplate an improved apparatus and method that overcomes the aforementioned limitations and others.

SUMMARY

In accordance with one aspect of the present exemplary embodiment, a multifunction communication system comprises a scanner and a multifunction device that processes data received from the scanner. The multifunction device comprises a user interface that allows a user to enter commands to configure at least one functional aspect of the multifunction device, wherein the user is presented with a logical progression of steps that inquire of the user information that is needed to complete an email function. An authentication component communicates with the user interface that requires a user to enter a valid username and password via the user interface to access specific functionality of the multifunction device. An email component facilitates sending one or more email messages that contain data received from the scanner. A receiving component that receives at least one email message from the multifunction device.

In another aspect of the present exemplary embodiment, a method for sending email of a scanned document via a multifunction machine includes presenting a logical progression of steps that inquire of the user information that is needed to complete an email function. An email address in the "From:" field is entered, and an email address in the "To:" field is entered. A login name and a login password are entered and the login name and password are authenticated. The scanning of a document is initiated and the scan is sent automatically to the user's email address upon completion of document scan.

In yet another aspect of the present invention, a method for limiting access to a multifunction device comprises activating an authentication component that communicates with the multifunction device, wherein the authentication component associates a user name and password with a user email address. A username associated with a valid account and a user password associated with the username are entered. The username and password are authenticated. Access to one or more functions of the multifunction device are allowed based at least in part upon the authentication of the username and password.

DETAILED DESCRIPTION

The following disclosure can relate to substantially any non touch screen multifunction device that provides email functionality. It is to be appreciated that this invention can be utilized with substantially any multifunction device.

Figure 1A:
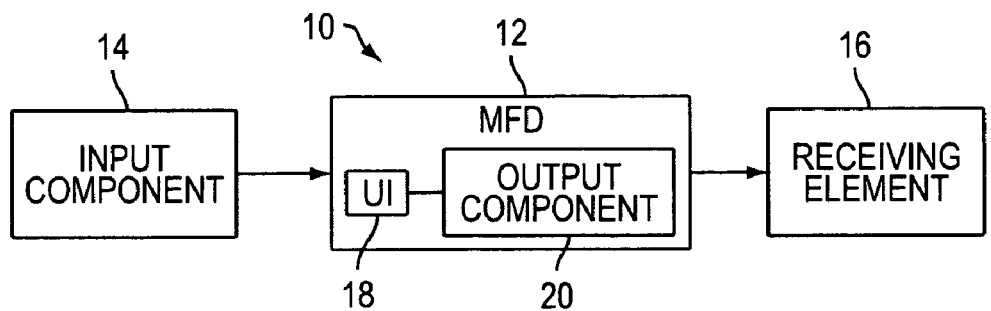
FIG. 1a is a block diagram of a multifunction device system that processes received data.

Referring to FIG. 1a, illustrated is a block diagram that shows a system 10 wherein a multifunction device (MFD) 12 receives data from an input component 14 and transmits the received data to a receiving element 16. The MFD 12 includes a user interface component 18 and an output component 20.

The MFD 12 can be substantially any system that allows a user to send and receive data. In one example, the MFD 12 can provide fax, email, copy and scan functionality. Data can be communicated utilizing any number of protocols and the MFD 12 in turn can transmit data in any number of protocols. The data can contain specific information relating to the content, format and layout of text and/or images on a particular media. In addition, the data can be formatted to accommodate various size media as desired. Typically such data is sent via a particular protocol that relates to imaging. It is to be understood that the data can be communicated utilizing any number of protocols and that the MFD 12 in turn can transmit data utilizing any number of communication standards and/or protocols. The data can contain specific information relating to the content, format and layout of text and/or images on a particular media. In addition, the data can be formatted to accommodate various size media as desired.

The input component 14 is employed to provide data to the MFD 12. The input component 14 can be a personal computer, a scanner, a paper tray, etc. In one example, the input component 14 is a scanner wherein media containing data is exposed to a reading element (not shown) and subsequently transmitted to the MFD 12. In another example, the input component is a personal computer wherein the data and/or images are created and stored on the personal computer. After creation, the data is transmitted to the MFD 12 for processing.

The receiving element 16 provides received data to a user in a particularized format. In one approach, the receiving element 16 is a marking engine that receives data from a personal computer via the MFD 12. In another approach, the receiving element 16 is a marking engine that receives data from the copy component. In this configuration, the input component would be a loading tray. In yet another approach, the receiving element 16 is a personal computer or server that receives an email from the MFD 12.

Figure 1B:
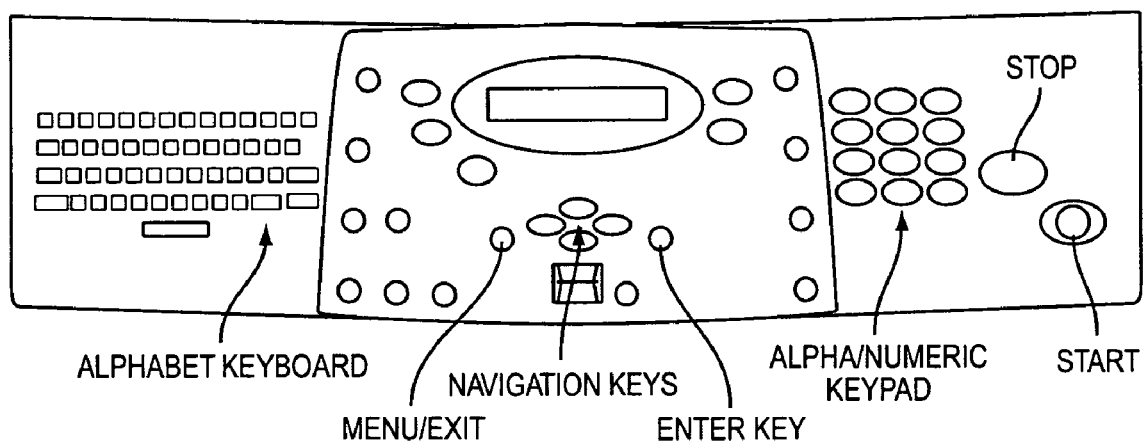
FIG. 1b illustrates a user interface employed with an exemplary embodiment.

The user interface 18 is employed to make desired changes to the functionality of the MFD 12. The user interface can include a display screen, one or more navigation keys for scrolling information as it is presented to a user on the display screen, an enter key, an exit, and so on. In this manner, the user interface can be employed to make desired functional changes to the MFD 12. In one embodiment, the user interface 18 is illustrated in FIG. 1b. In addition, the user interface 18 can display a logical order and progression of information to determine appropriate task selection.

In one example, the user interface 18 is employed to change the output of the MFD 12 to provide copy functionality. In this example, data is received from a scanner and such data is provided to the user on a media in a desired format. The user can specify the format of the data to be printed such as relative size, zoom level, contrast and the like via the user interface component 18. The data is transmitted based on such a determination to the receiving element 16 which in a preferred embodiment is a marking engine.

In another approach, the output component 20 can provide email functionality. In this embodiment, the MFD 12 receives data from a scanner and then outputs received data to a mail server or a personal computer. The MFD 12 communicates with the input component 14 utilizing standard protocols. The received data is processed and configured by the MFD 12 to broadcast to one or more recipient email accounts. Such email accounts can be accessed utilizing a number of disparate means such as personal computers, laptop computers, palmtop computers, cell phones, and so on.

Figure 2A:
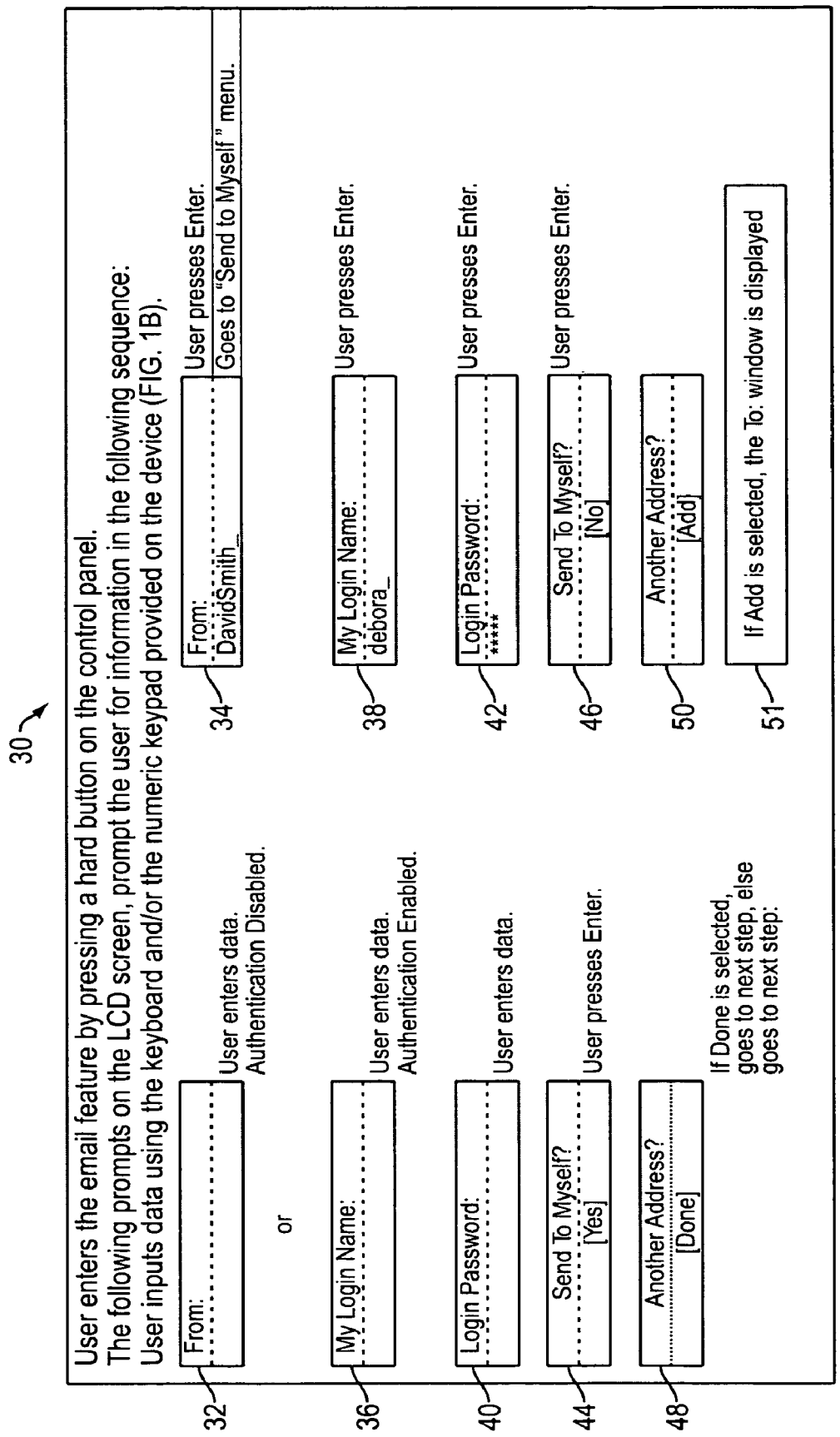
FIGS. 2a and 2b illustrate a series of prompts displayed to a user to provide an intuitive interface to the multifunction device.
Figure 2B:
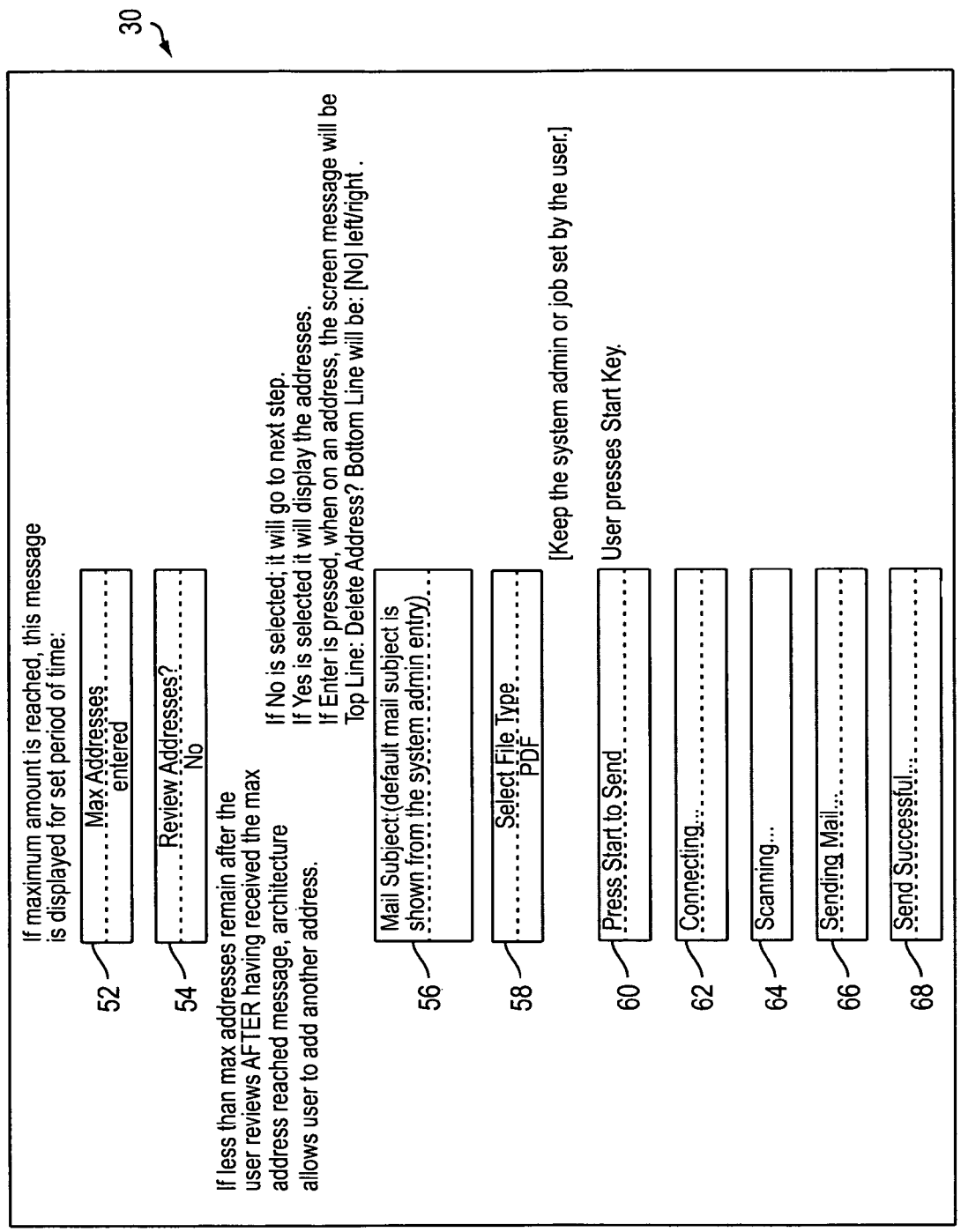

FIGS. 2a and 2b illustrate a flow chart 30 that shows a series of displays presented to a user of the MFD 12 from FIG. 1b above. Such displays provide logical order and presentation of disclosure of needed information to the user. This data presentation provides a series of intuitive prompts that allow a user to efficiently navigate decisions to communicate received data to one or more recipients. The displays illustrate a non-touch screen device that employs an LCD display to communicate information to a user. It is to be appreciated that similar functionality can be employed via a touch screen device.

Referring to FIGS. 2a and 2b, also illustrates a system and method by which a logical order of prompts is dependent on the enablement or disablement of the authentication. The logical order presents a "wizard" like function where two disparate flow paths for input screens are dependent on whether authentication of the MFD 12 is enabled or disabled. If authentication is disabled, at 32 the MFD presents a prompt that requires the user to enter the "From" field of the email address. The user can employ a keyboard, such as the keyboard illustrated in FIG. 1b, to manually enter such data. Alternatively, the "From" field can be populated from a memory of stored addresses or a default address can be automatically stored to user interface for the "From" field utilizing, for example, an address book key and/or a customizable ".com" key, as described below. At 34, an exemplary name "David Smith" is entered. As noted, such entry can be accomplished via manual entry or from a memory store. It is to be appreciated that an "Enter" key or equivalent can be employed to indicate to the MFD 12 that a response has been entered.

If authentication is enabled, at 36, a prompt requires a login name to be manually entered. At 38, an exemplary login name "debora" is entered via manual entry and/or from a data store. At 40, a prompt is presented that requires a login password to be entered. At 42, a password is entered that is represented by a series of asterisks to mask the entered text string. In this manner, the user password cannot be observed by one or more undesired third parties.

When authentication is enabled, the username and password are associated with a particular set of data stored locally within the memory (not shown) of the MFD 12 or associated to a set of data on an external server. Such data can include the sender's (e.g., user's) email address, an address book, a group list and so on. In addition, authentication provides a level of security to prevent undesired use of the MFD 12.

At 44, a prompt asks the user if they wish to send the email message to themselves. This prompt allows the user to toggle between a "Yes" response and a "No" response utilizing one or more navigation keys, as shown in FIG. 1b. At 44, the response is set to "Yes" and at 46, the response is set to "No." Next, a prompt requires the user to enter one or more email recipient addresses by toggling between a "Done" function and an "Add" function. At 48, the response is set to "Done" and at 50, the response is set to "Add." If "Done" is selected, a subsequent prompt is displayed. If not, a "To:" prompt (not shown) is displayed to allow the user to enter a recipient's email address. In one embodiment, a maximum number of recipients can be associated with a single email message. In another embodiment, there is no limit to the number of the recipients that can receive an email message.

Referring to FIG. 2b, at 52, a message indicating that the maximum number of addresses has been reached is displayed. Such maximum can be predetermined. At 54, the user can review the recipient email addresses entered to receive a particular email message. If less than the maximum number of addresses remain after the user reviews, a prompt will allow the user to add additional addresses until the maximum is reached. If "No" is selected, the appropriate subsequent prompt will appear. If "Yes" is selected, the recipient addresses will be displayed. In one embodiment, when an "Enter" key is pressed while an address is displayed, the display will read "Delete Address?" The user will select the default "No" response or, using the navigation arrows and enter key, select "Yes."

At 56, a prompt requests a user to enter the subject of the email. In one embodiment, the user can enter such information manually via keyboard or similar data entry device. In another embodiment, the subject name can be determined from a preconfigured list in a data store. In yet another embodiment, the subject is downloaded by the system administrator through the connection interface to the MFD 12. In this embodiment, the subject can be employed as a default for any email sent that is associated with a particular user account. In addition, the subject can be set by the system administrator to be editable by the user or non-editable for security purposes.

At 58, the user enters the file type that he/she wishes to send the one or more scanned documents. For example, the user can select from .pdf, .bmp, .jpg and the like. A default value can also be predetermined such as a .pdf format, for example. Various file types can be determined by a system administrator, a user and so on.

At 60, the user is prompted to press the Start key to send the email. At any time during the process, once the user has been validated by the system, the user, either through authentication or by entering the "From:" address, can press the START key and the MFD 12 will use all the system defaults to send the document. The document will be sent minimally to the sender using all of the default parameters or to all other recipients also programmed by the user.

At 62, the user is notified that the MFD 12 is connecting to a server (or other device) to send the email message. At 64, the user is notified that the MFD 12 is scanning the data to be attached to the outgoing email message. At 66, the prompt indicates that the email is being sent. At 68, a prompt confirming the email is successfully sent is indicated.

Figure 3:
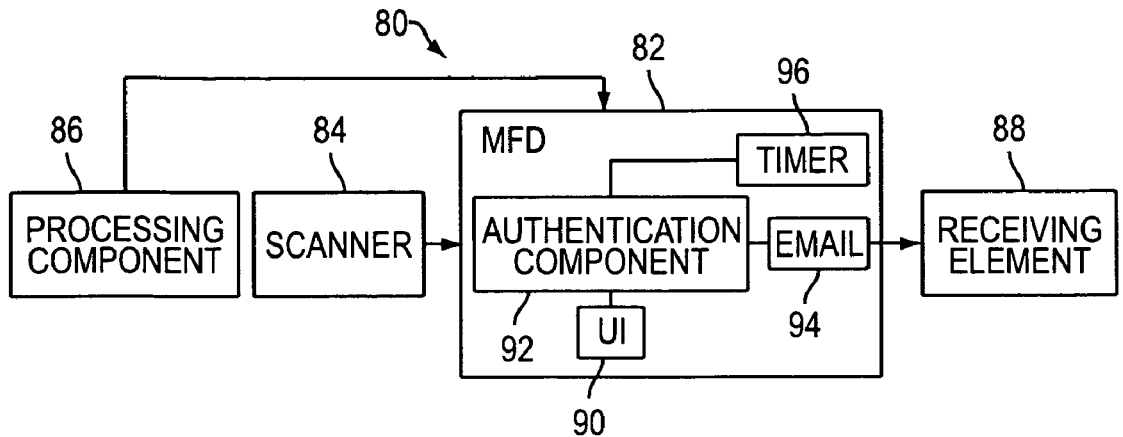
FIG. 3 is a block diagram that employs an authentication component to require a user to log in to the system.

Turning to FIG. 3, a block diagram of a system 80 is illustrated wherein an MFD 82 receives data from a scanner 84. A processing component 86 is employed to interface with the MFD 82. The processing component can be substantially any device that communicates with the MFD 82. In one example, the processing component 86 is a personal computer. In another example, the processing component 86 is an external server.

A receiving element 88 receives data transmitted from the MFD 82. The MFD 82 contains a user interface 90 employed to communicate with an authentication component 92. The authentication component 92 is employed to allow an email component 94 to transmit data via email to one or more recipients. A timing device 96 is operatively connected to the authentication component 92 that provides a predetermined amount of time for a user to respond to an authentication request.

The scanner 84 transmits data from various media to the MFD 82. The scanner can employ any number of known standards to capture and transmit data to the MFD 82. In one example, the scanner 84 can accept 8.5"×11" paper and scan either black and white text or images. In another example, the scanner 84 can accept color images. The scanner 84 transmits received data to the MFD 82.

The processing component 86 can contain any number of various processing components and memory. In addition, the processing component 86 can interface to one or more peripheral devices such as a marking engine, a mouse, a display and the like. The processing component 86 can communicate with the MFD 82 utilizing any one of various media such as Ethernet cable, coaxial cable, wireless interface and the like and through one or more connected networks. Standard communication protocols can be employed to facilitate such communication. The processing component 86 can run one or more applications employed to communicate specifically with the MFD 82.

In one embodiment, the processing component 86 communicates with the authentication component 92 contained within the MFD 82. In another example, the processing component 86 is employed to activate the authentication component 92. When the authentication component 92 is activated, a user is prompted to enter a username and password associated with a particular account. The account can be configured and stored on the processing component 86 and/or the MFD 82. The account can contain various information related to the user such as the user's email address, address book, default subject line, etc.

The account can also be associated with a particular security level. For example, one security level may allow a user to send email messages to substantially any desired address. Another security level may restrict the email recipients, number of emails allowed within a particular time period, etc. In yet another example, the security level can be associated with the type of functionality the user may access. For instance, one security level can permit copy functionality only while another security level can allow copy, scan, fax and email functionality.

In one embodiment, the user interface 90 is a non-touch screen device that employs an LCD to display information to a user. The user can communicate with the MFD 82 utilizing an alpha-numeric keyboard and/or one or more navigation keys. In addition, the user interface 90 can provide an intuitive series of prompts to allow a user to efficiently configure the functionality of the MFD 82.

Conventional multifunction machines provide email as a service function. In such conventional systems, a user may be required to be authenticated through a login process to allow the user to access such email functionality. The user is then identified with outgoing email activity from that device during their login time. However, in such conventional systems, after the user has completed their email activity, it is incumbent on the user to de-activate their authentication to prevent a second user from accessing and utilizing the first user's account. In this scenario, the second user could send documents under the first user's identity. Thus, in such conventional systems, the user must remember to log off of their account to disallow unauthorized activity related to their account.

Figure 4:
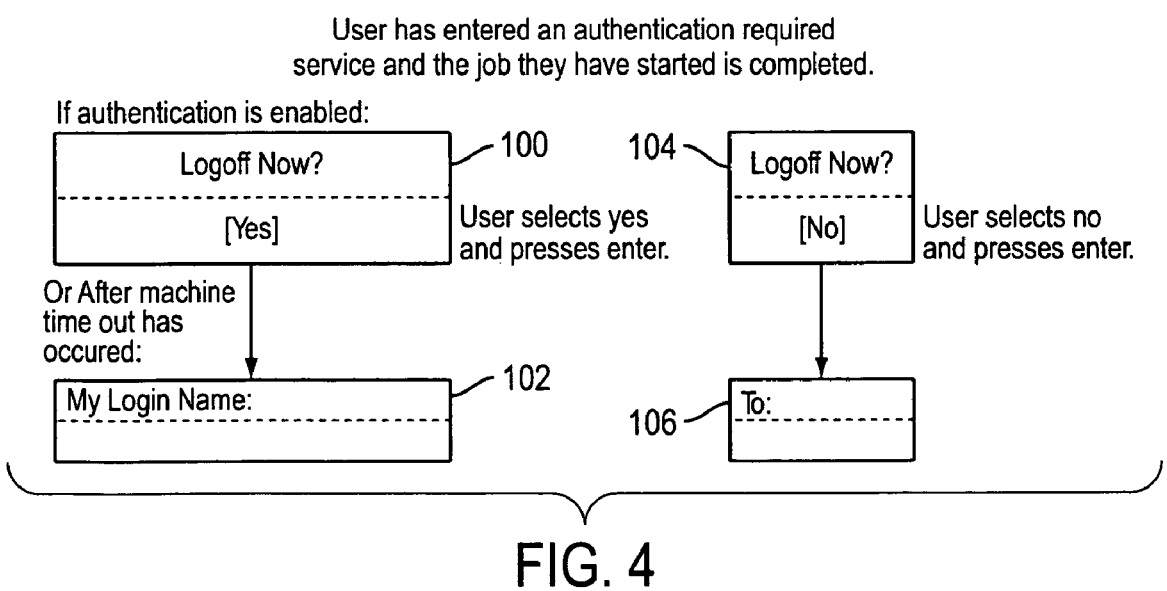
FIG. 4 illustrates a series of prompts displayed to a user to require a user to remain logged into the system.

In order to eliminate the above mentioned security issues, the MFD 82 utilizes messaging prompts within an activity flow to prompt a user to make an informed decision to log off or to remain authorized within the service authentication model (e.g., as illustrated in FIG. 4 below). When the MFD 82 has detected completion of a single job activity, it prompts the user to remain logged in or to logoff the service in which they are authenticated. In this manner, the user is notified that they must make a decision to remain authenticated in order to continue operation of the MFD 82 under the current account. In one example, the user has completed sending an email from the MFD 82 and a prompt appears to notify the user they have sixty seconds to remain logged on to their account. If the user does not respond within the predetermined window of time, the user is automatically logged off the MFD 82.

The timing device 96 is employed to set a period of time allowed before the user is automatically logged off the account. The timing component 96 can interface to the authentication component 92 and establish times related to the amount of time allowed before an account is deactivated based on particular events, functionality, etc. If the user does not respond to requests to continue utilizing an account and the predetermined amount of time has lapsed, the timing device 96 can de-activate the account.

The receiving element 88 can be substantially any device capable of receiving data transmitted from the MFD 82. For instance, the receiving element can be a marking engine, a laptop computer, a desktop computer, a server, a handheld computer, a cell phone, a personal digital assistant and the like. The receiving element 88 can present received data to the user in any number of formats including audio and visual including various images, sounds and the like.

Turning to FIG. 4, shown is a series of user prompts from the user interface 90 of the MFD 82. Such prompts are displayed when the authentication component 92 is active. It is assumed that the user has already logged into their account and that one or more predetermined events (e.g., send email, etc.) has occurred. A prompt requests a user to decide if they would like to logoff their account. At 100, the user indicates "Yes" by toggling the response via one or more navigation keys and presses an enter key (or equivalent). At 102, a prompt indicates that the user must enter a login name to re-access an account associated with the MFD 82. At 104, the user indicates "No" to the logoff prompt via keyboard entry, navigation keys, etc. Subsequently, at 106, the MFD 82 prompts the user to enter a recipient email address to send another email from the machine. The logoff prompt will appear each time after a pre-determined event occurs. Such predetermined event can be configured utilizing one or more devices that communicate with the MFD 82 such as the user interface 90, the processing component 86 and the like.

Figure 5:
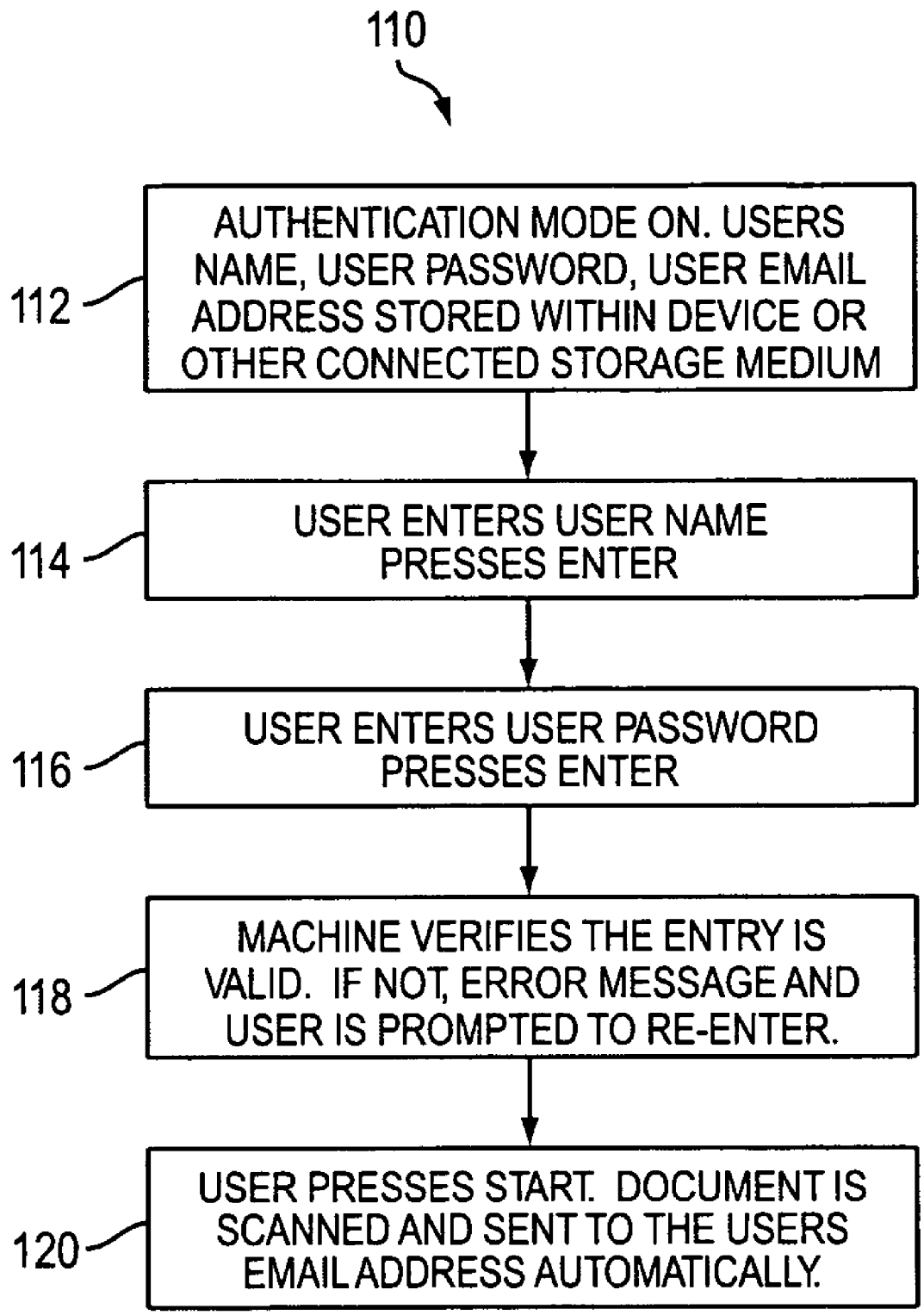
FIG. 5 shows a methodology that allows a user to automatically send data to a particular address.
Figure 6:
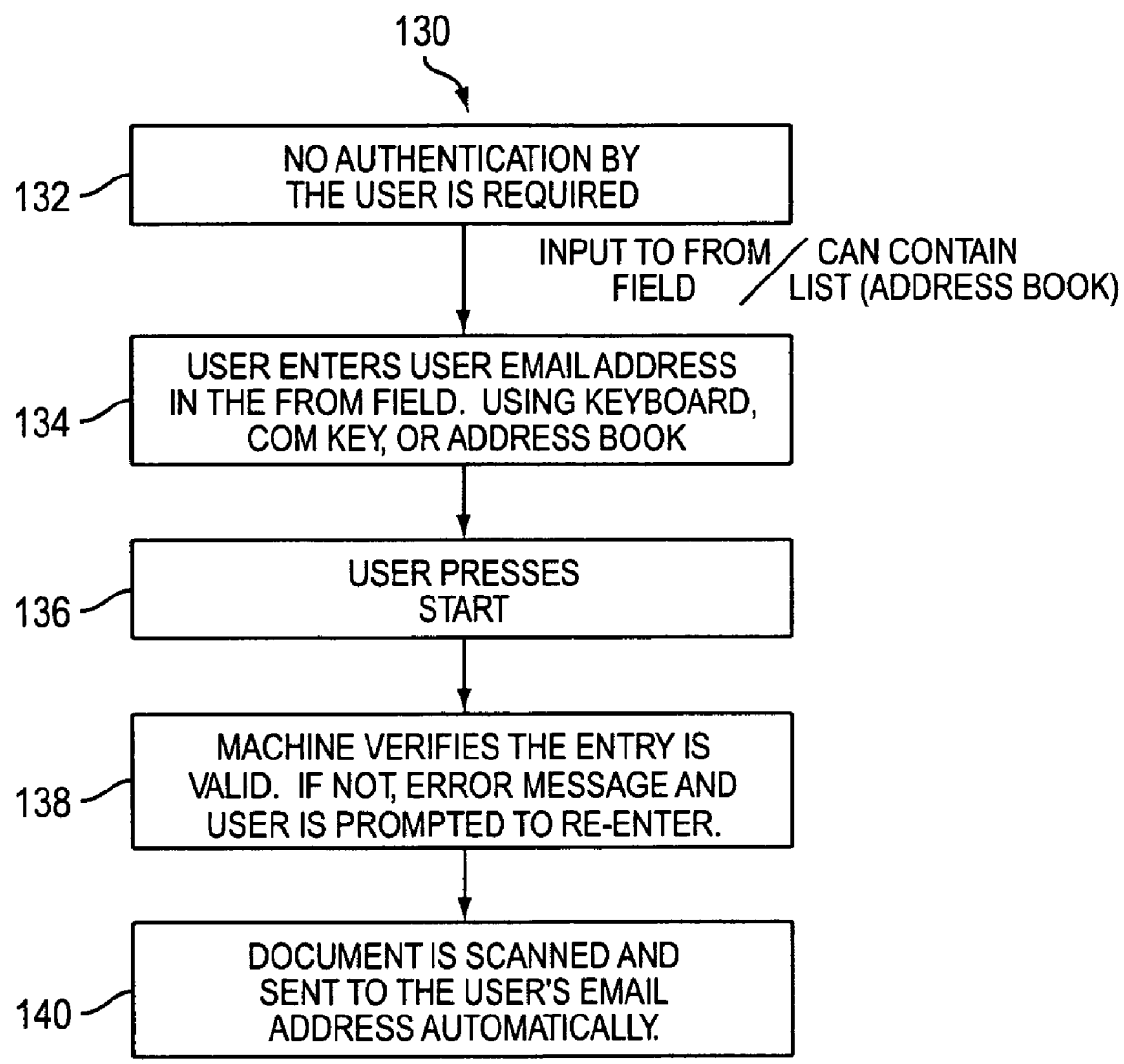
FIG. 6 shows a methodology that allows a user to automatically send data to themselves.
Figure 8:
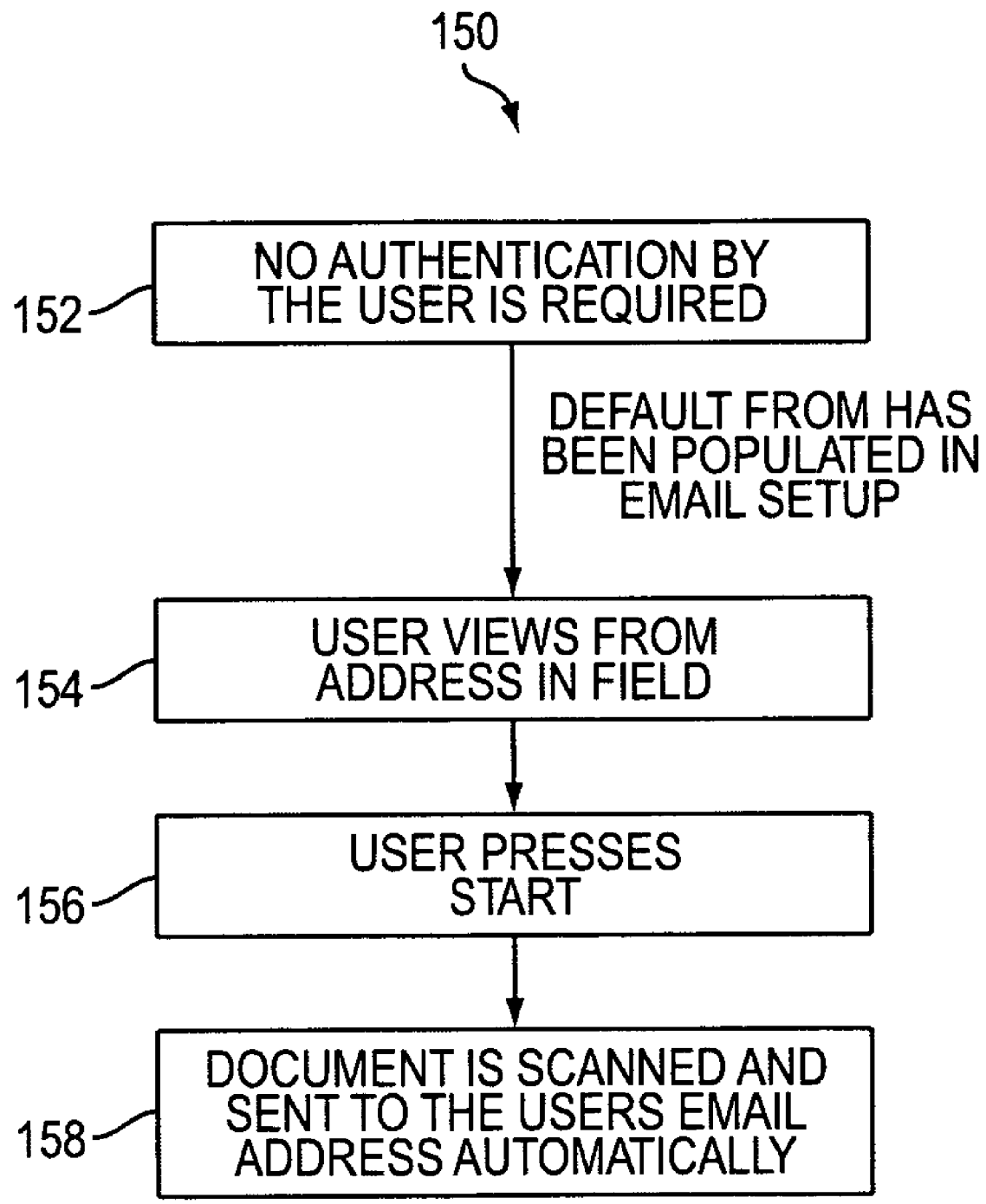
FIG. 8 shows a methodology that allows a user to automatically send data to a particular address.

FIGS. 5, 6 and 8 illustrate an auto send to self feature employed with email functionality of a multifunction machine. Referring now to FIG. 5, illustrated is methodology 110 for users utilizing email functionality with a multifunction device (e.g., MFD 12 and/or MFD 82, etc.) Typically, users simply want to scan a document or other media containing data to themselves. After the user receives the emailed data, they can manipulate (e.g., format, edit, etc.) the data and/or send the data to a wider distribution from the device the data that received the data (e.g., computer, processor, handheld PC, PDA, etc.) With a process that requires authentication, it is usually cumbersome for the user to send document(s) (or other data), having to enter an address book to locate themselves, select themselves, and initiate a send function.

It is to be appreciated that prior to the first step of this methodology, the user has loaded a document or other media into the multifunction device and that such media is ready to be scanned. At 112, the authentication mode is activated (e.g., the authentication component 92 is turned "on"). At 114, a user enters user name as indicated by a prompt and subsequently presses the "Enter" key or equivalent. At 116, a user enters user password as indicated by a prompt and subsequently presses the "Enter" key or equivalent. At 118, the multifunction device verifies that the username and password are valid. If not, an error message is displayed to the user that requests re-entry of a username and password. At 120, after the multifunction device determines that a username and password are valid, the user presses a "Start" key. The document (or other media) is sent to the user's email address automatically.

FIG. 6 illustrates a methodology 130 wherein user authentication is not active (e.g., authentication component 92 is turned "off"). At 132, no authentication by the user is required. At 134, a user enters user email address in the From field to send an email. The entry can be made utilizing manual entry via a keyboard or by selection from an address book. In addition, the user can employ a special key (e.g., a ".com" key) that accesses a list of commonly utilized email address or portion of an email address. For example, the ".com" key can access a list such as ".com," ".org," ".gov," and ".net." Alternatively, the ".com" key can simply input commonly utilized addresses in the "To:" or "From:" field of an email. In this manner, the user can quickly access a list of the most commonly utilized mail addresses or domains. In addition, the ".com" feature can be user specific such that each user has a particular list associated with their account.

Figure 7:
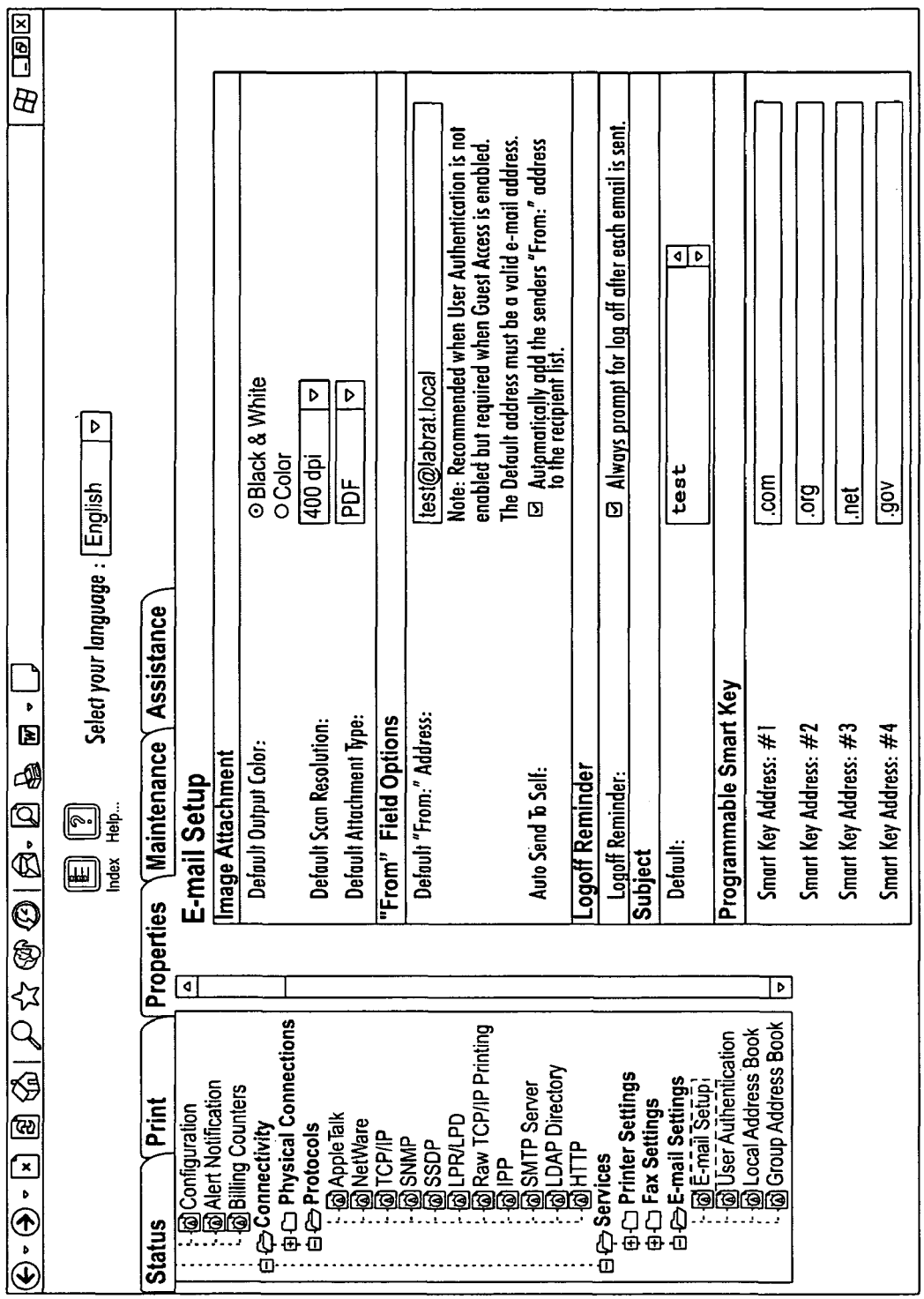
FIG. 7 shows an application employed to communicate with a multifunction device to configure a ".com" key.

At FIG. 6, a user presses start. At 138, a machine verifies the entry at 134 is valid. If the entry is not valid, an error message is displayed and the user is prompted to re-enter information. At 140, the document is scanned and sent to the user's email automatically. Turning briefly to FIG. 7, illustrated is an interface 146 employed to configure and populate the ".com" as desired. As shown, the interface contains a plurality of fields wherein desired commonly used text strings can be entered.

Referring to FIG. 8, which illustrates a methodology 150 wherein user authentication on a multifunction device is inactive (e.g., authentication component 92 is turned "off"), yet auto send to self has been enabled (as illustrated in FIG. 7). At 152, no authentication by the user is required and a default "From:" is populated in the email setup upon loading of the paper or other media in the scanner. At 154, the user views the "From:" address in the field and at 156, the user presses the "Start" key (or equivalent) on the multifunction device. At 158, the document or other media is scanned and sent to the user's email address automatically.

Figure 9:
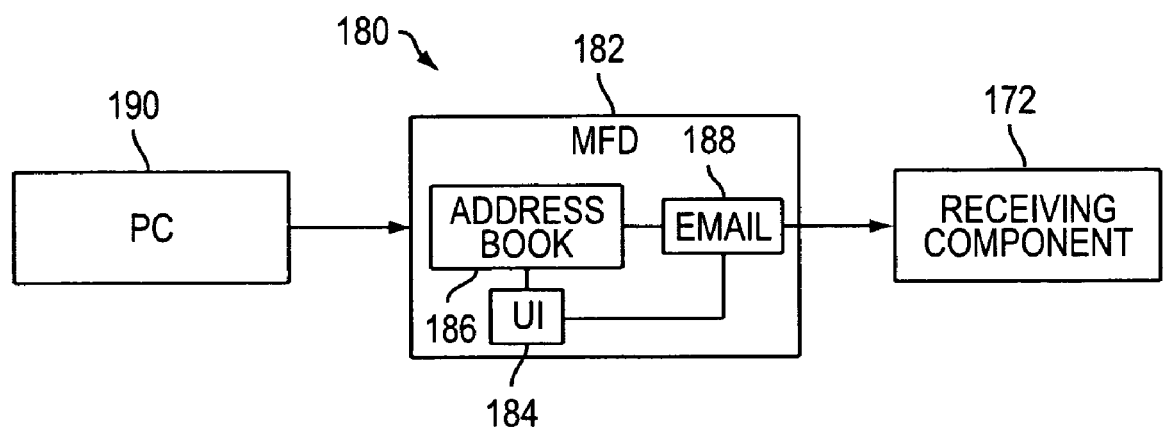
FIG. 9 is a block diagram that employs an address book to locally store, edit and retrieve one or more addresses.

FIG. 9 shows a system 180 that includes the MFD 82 that includes the user interface 90, an address book 186 and the email component 94. A personal computer 190 interfaces with the MFD 82 and a receiving element 88 receives data sent from the MFD 82. The personal computer 190 can be employed to populate, delete, edit, organize and store one or more addresses for subsequent retrieval.

Figure 10:
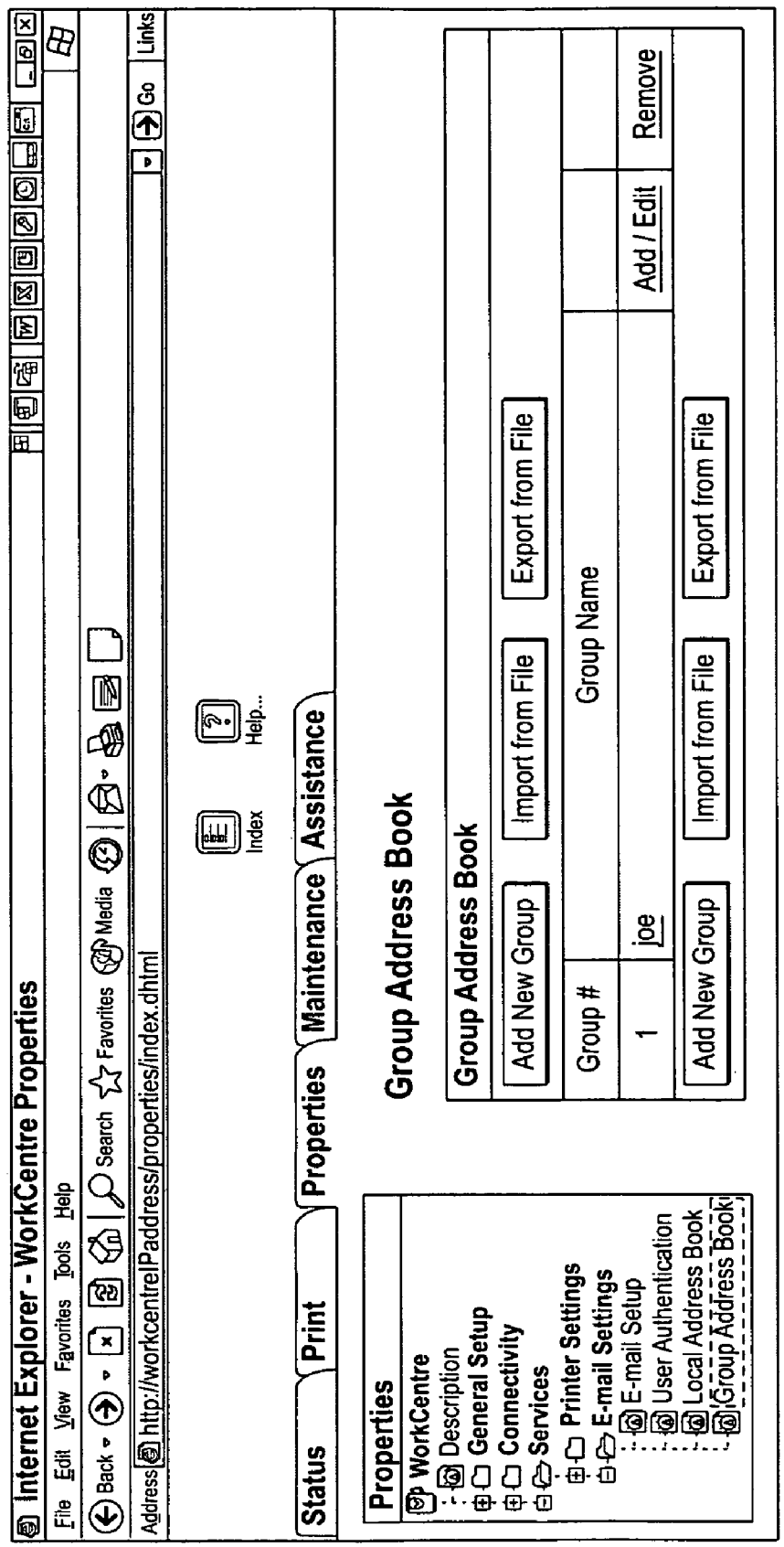
FIG. 10 shows an application employed to communicate with a multifunction device to configure a group address book.
Figure 11:
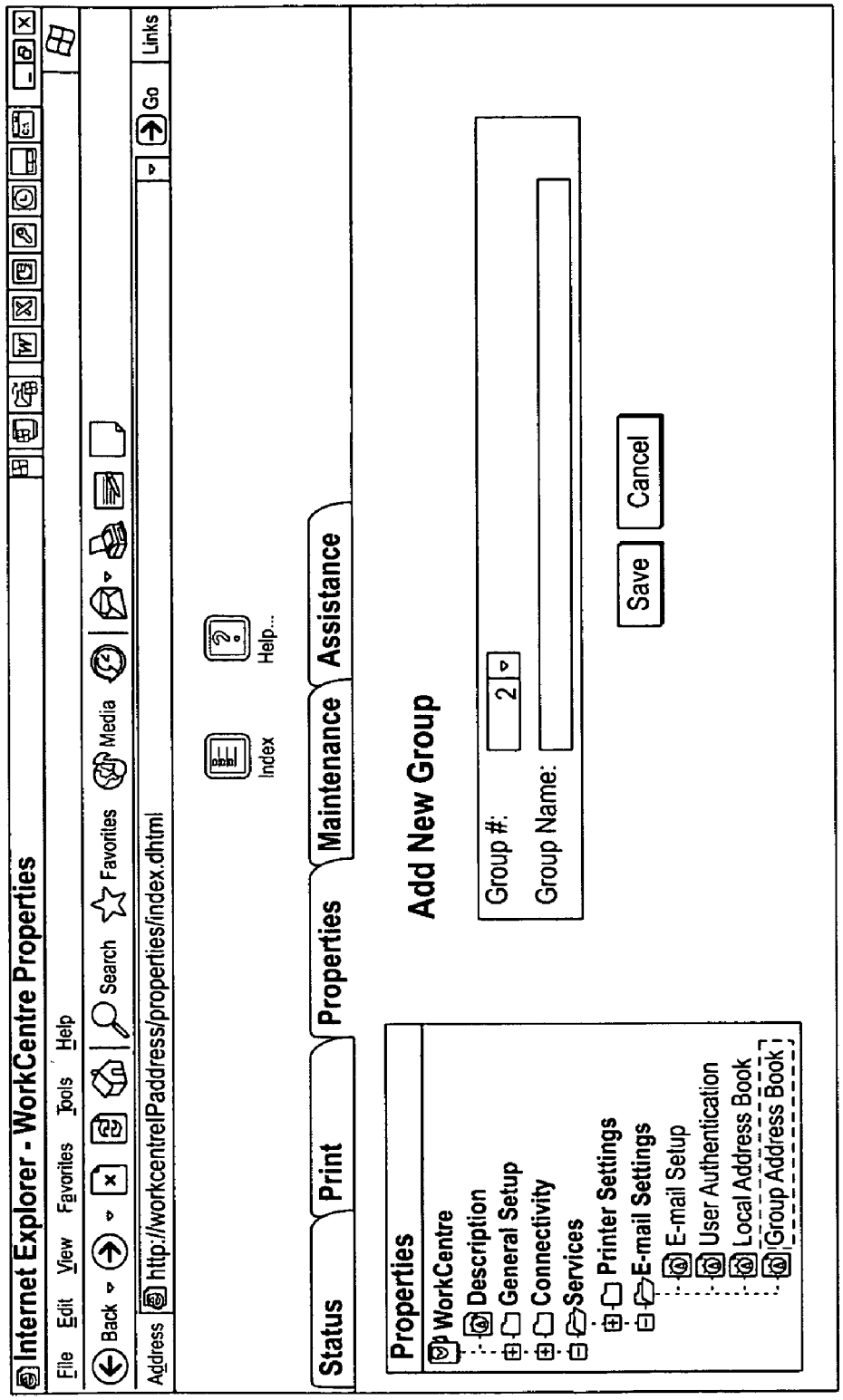
FIG. 11 shows an application employed to communicate with a multifunction device to configure a group address book.
Figure 12:
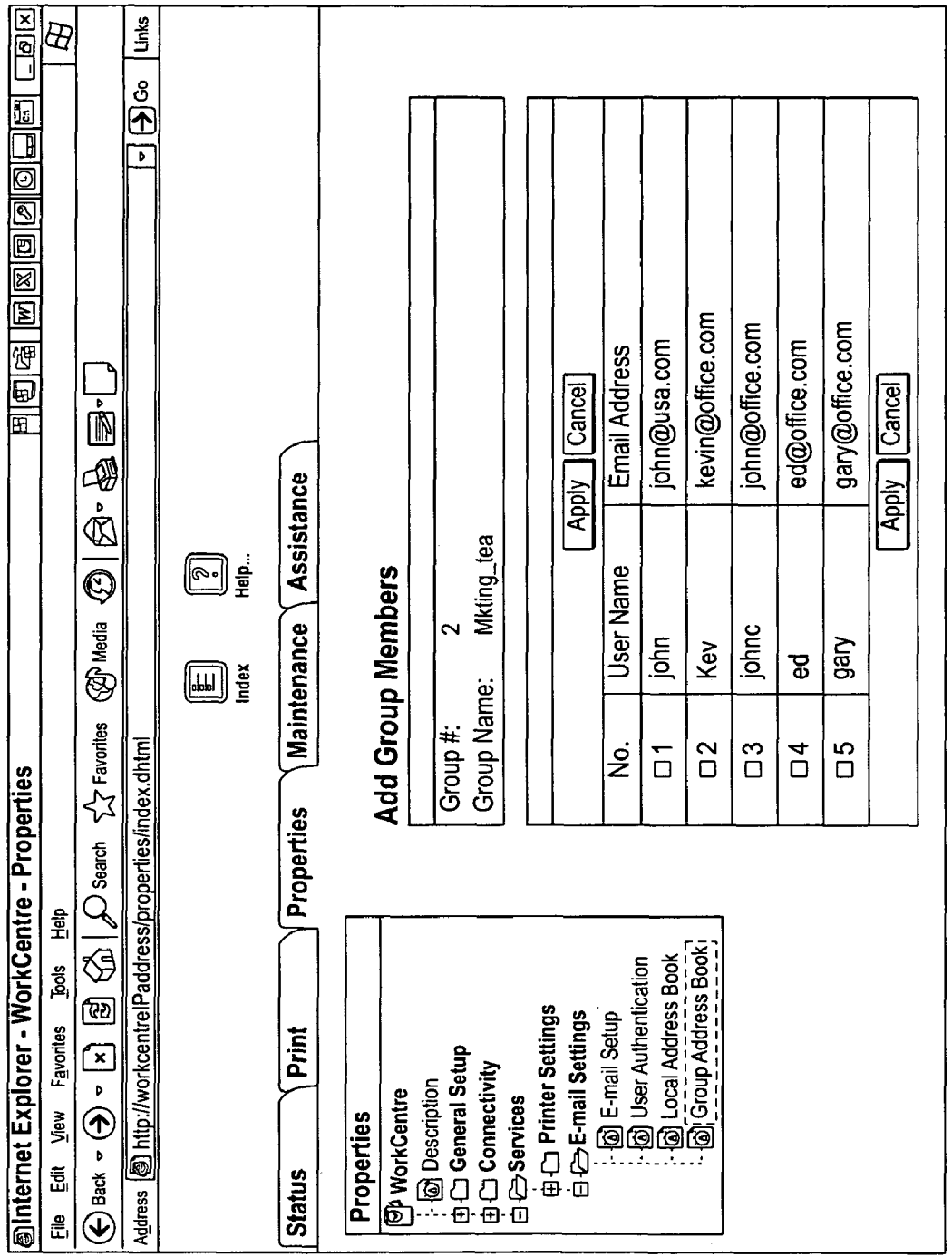
FIG. 12 shows an application employed to communicate with a multifunction device to configure a group address book.
Figure 13:
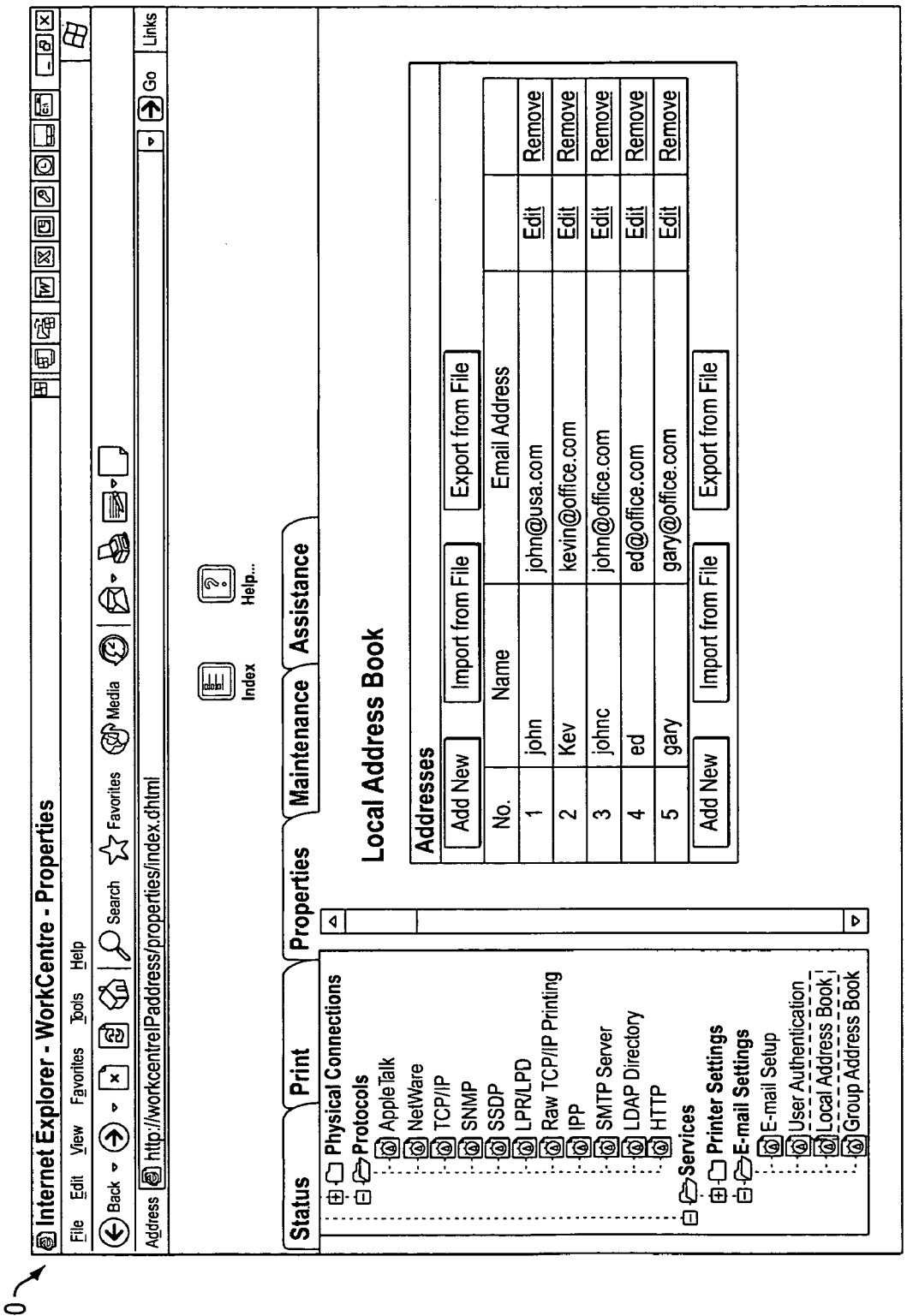
FIG. 13 shows an application employed to communicate with a multifunction device to configure a group address book.
Figure 14:
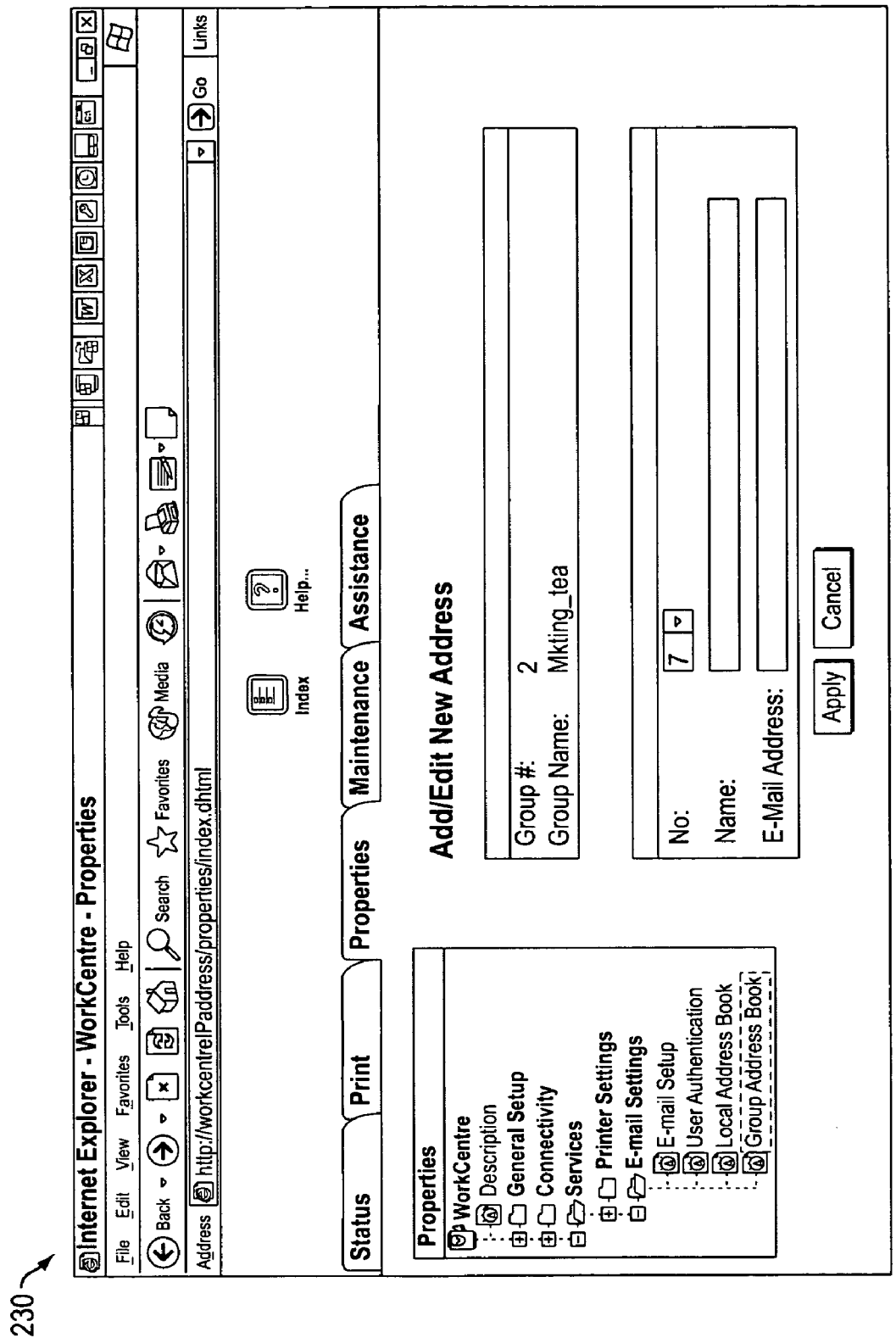
FIG. 14 shows an application employed to communicate with a multifunction device to configure a group address book.
Figure 15:
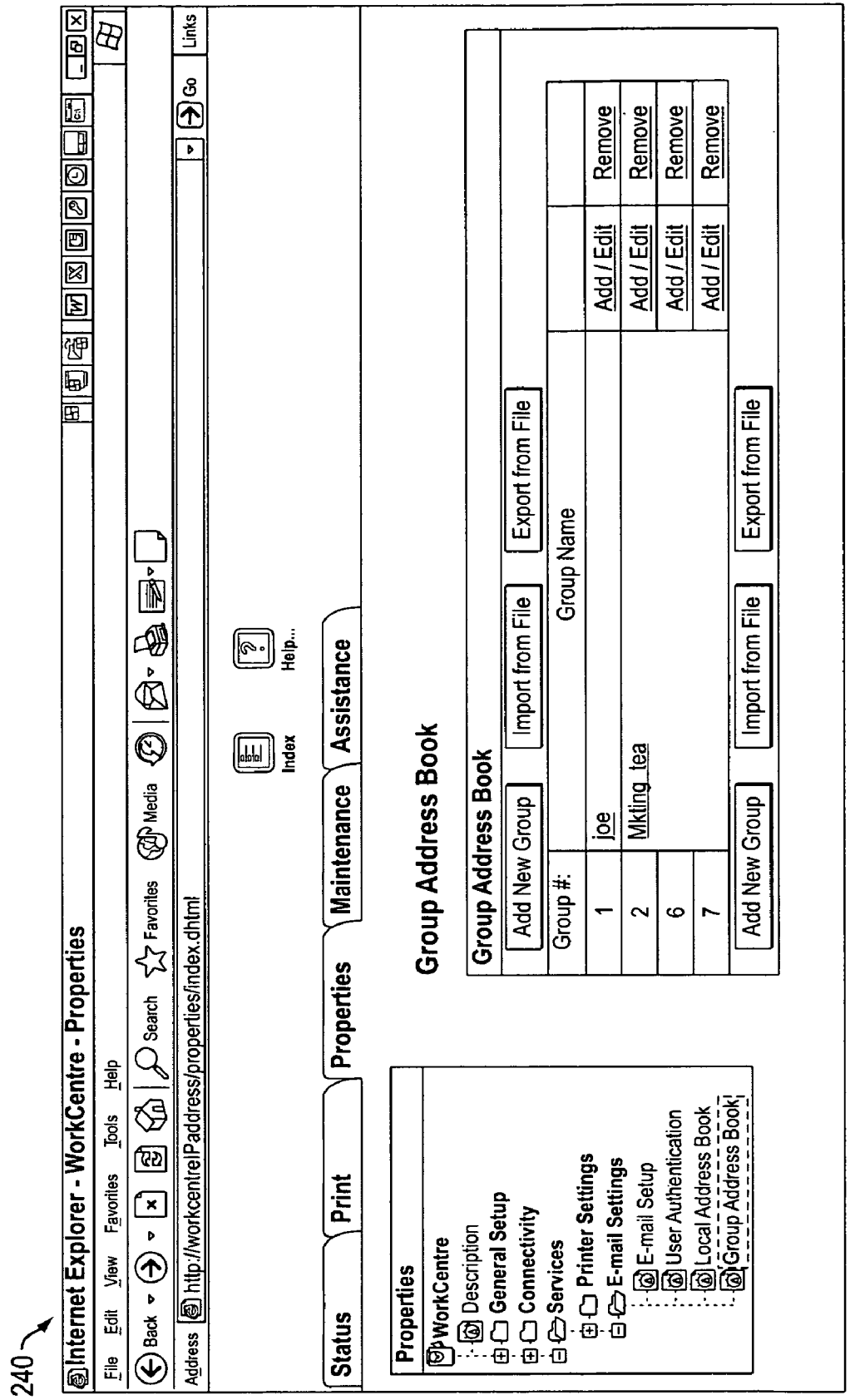
FIG. 15 shows an application employed to communicate with a multifunction device to configure a group address book.
Figure 16:
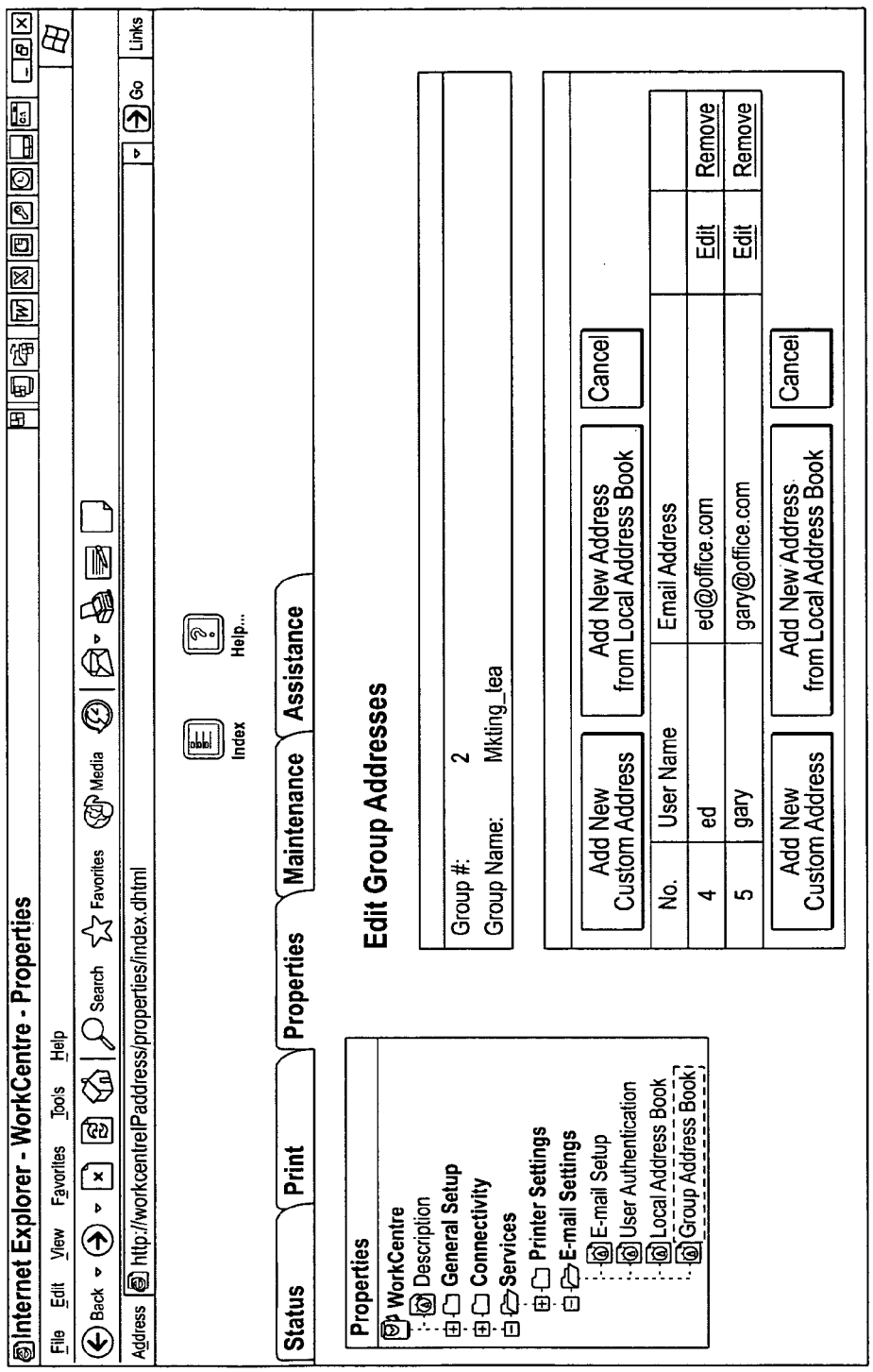
FIG. 16 shows an application employed to communicate with a multifunction device to configure a group address book.

FIGS. 10-16 show user interface applications employed to remotely interface to the local address book 186. FIG. 10 shows an interface 192 that lists the group address books configured on this system. FIG. 11 illustrates an interface 200 to add a new group to the address book. FIG. 12 illustrates an interface 210 to add group members to a particular group. FIG. 13 illustrates an interface 220 that lists members and corresponding email addresses of a particular group. FIG. 14 shows an interface 230 employed to edit and/or add one or more addresses within a particular group. FIG. 15 shows an interface 240 that lists plurality of groups within a user's group list. FIG. 16 shows an interface 250 to edit one or more group addresses associated with a particular user.

Figure 17:
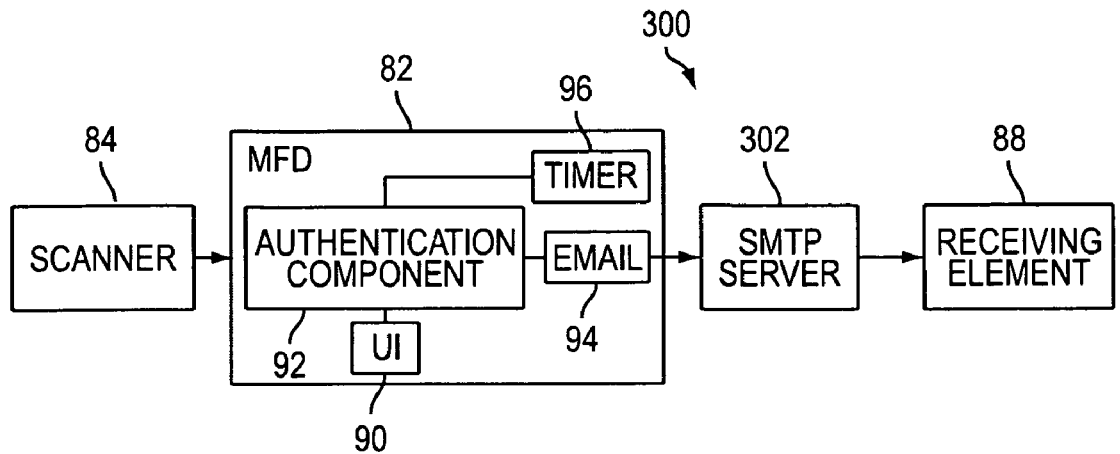
FIG. 17 is a block diagram that allows a multifunction device to communicate with a receiving element via an SMTP server.

FIG. 17 shows a system 300 that includes the MFD 82 that receives data from a scanner 84 and transmits data to a receiving element 88 via an SMTP server 302. The MFD 82 includes the user interface 90 employed to communicate with the authentication component 92. The authentication component 92 is employed to allow an email component 94 to transmit data via email to one or more recipients. The authentication component interfaces with a timing component 96 that determines the amount of time a user has to respond to a prompt before a predetermined event (e.g., log off the account, etc.) occurs.

Communication with the receiving device 88 via the SMTP server 302 provides communication security not employed in conventional email functionality of multifunction devices. After the MFD 82 has received data and is configured to send the data to the receiving device 88, an authorization process is initiated with the SMTP server 302. Authentication with the SMTP server employs several well established authentication protocols such as Kerberos and hashing algorithms such as Message-Digest algorithm 5 (MD5).

Figure 18:
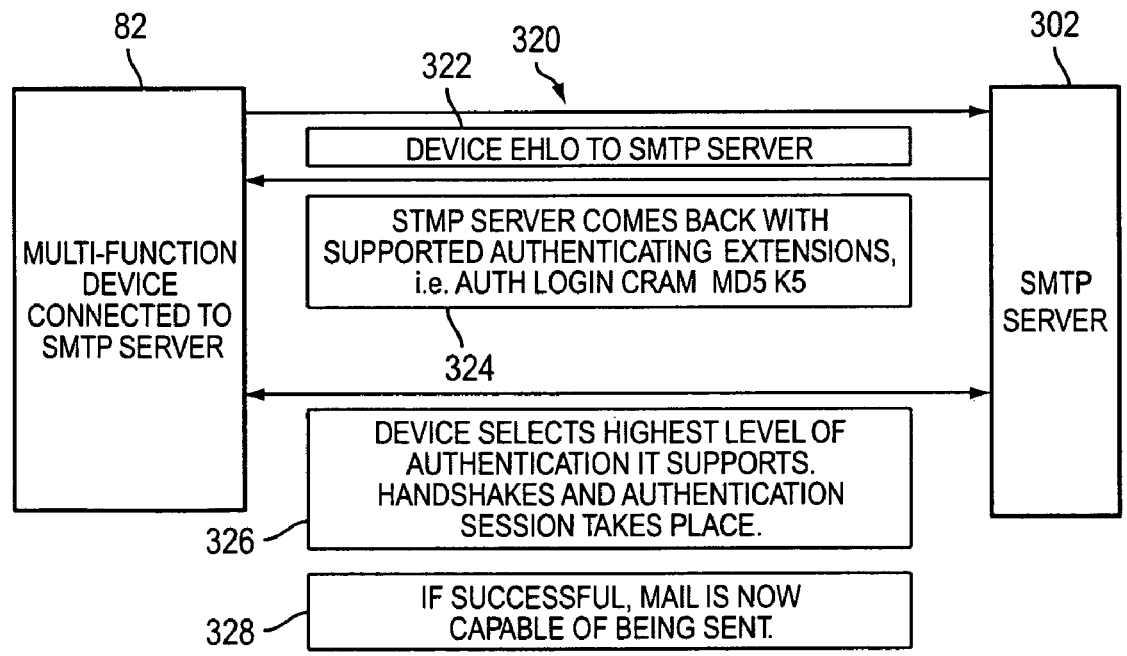
FIG. 18 shows a methodology that allows a user to communicate with an SMTP server via a multifunction device.
Figure 19:
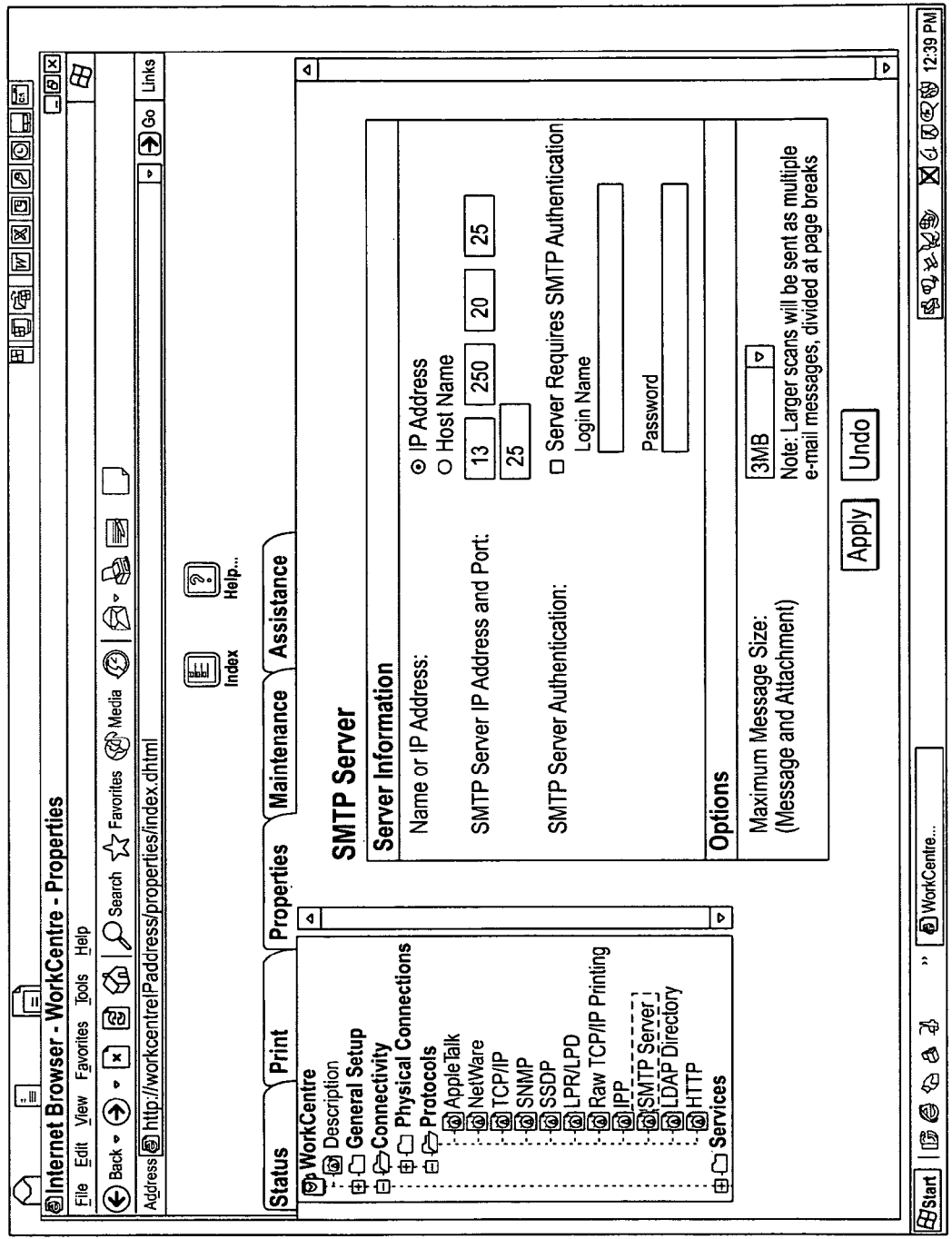
FIG. 19 shows an application employed to communicate with a multifunction device to configure SMTP server authentication.

FIG. 18 shows a methodology 320 utilized for communication between the SMTP server 302 and the multifunction device 82 that interfaces to the SMTP server 302. At 322 the multifunction device initiates communication with the SMTP server 302. At 324, the SMTP server 302 replies with a message utilizing a known authentication protocol such as Kerberos, secure socket layer (SSL), MD5, Authenticated Post Office Protocol, NTLM and the like. In one embodiment, the message is "AUTH LOGIN CRAM MD5 K5." At 326, the multifunction device 82 selects the highest level of authentication that the device can support wherein handshakes between the multifunction device 82 and SMTP server 302 take place. At 328, if authentication is successful, the multifunction device 82 sends at least one email to the SMTP server 302. FIG. 19 shows an application interface 350 that allows a user to configure one or more security parameters of the multifunction device 82 associated with at least one SMTP server.

Figure 20:
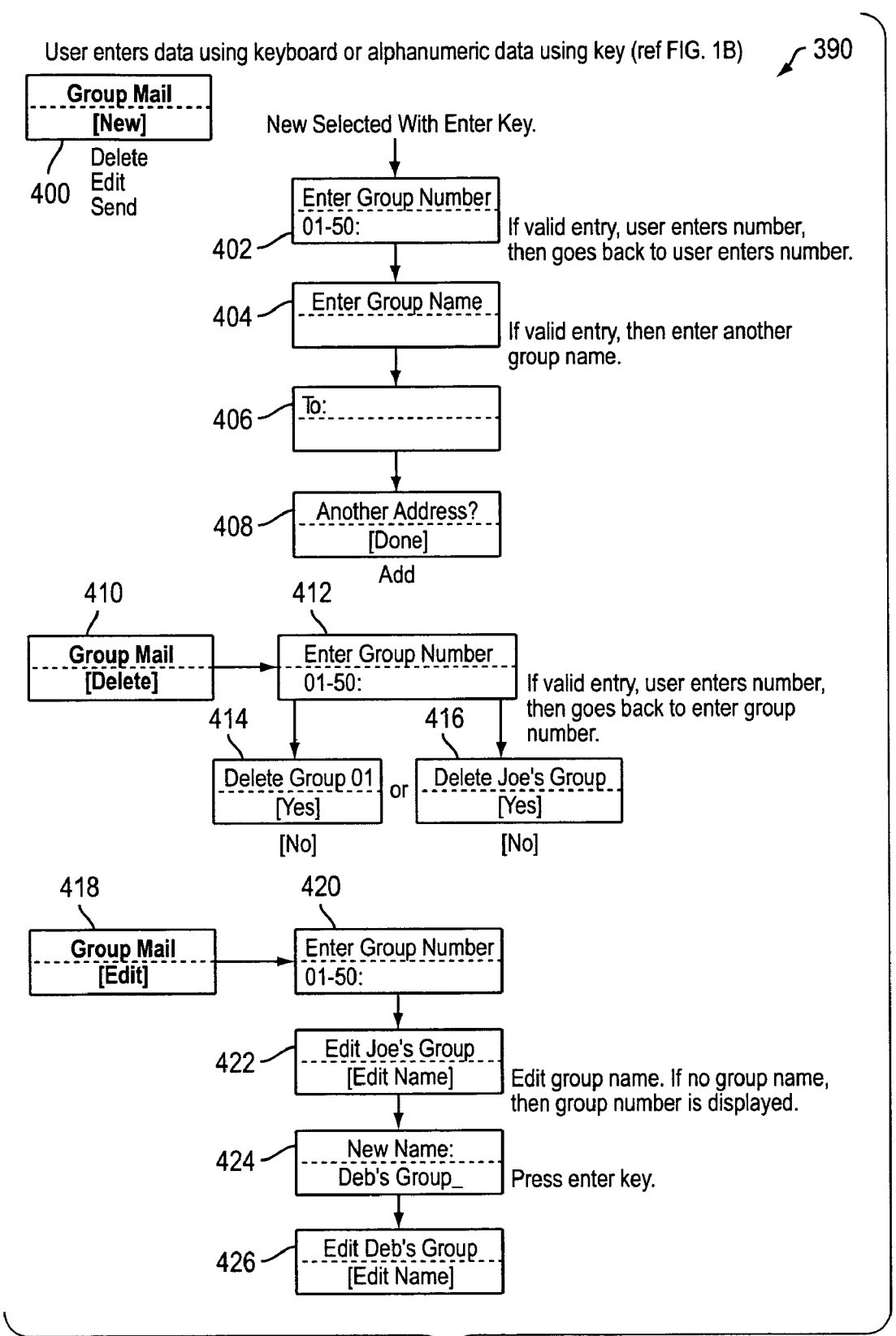
FIG. 20 shows a methodology that employs a series of prompts to configure a group email address book.

FIG. 20 shows a methodology 390 that employs a series of prompts to configure a group email address book. Such a methodology can be employed with a non-touch screen device and/or remotely via web application. Conventional multifunction device systems restrict address book storage to a server or other remote device. Such conventional systems require users to access groups from an LDAP or email server.

A series of prompts allow a user to utilize a group mail function within a device (e.g., MFD 12 and/or MFD 82, etc.). Reference numeral 400 illustrates a prompt that allows a user to create, delete, and/or edit an email group and/or send email to one or more email groups. A user can scroll through prompts "New," "Delete," "Edit," and "Send," etc. to access one or more corresponding functions. A user can scroll through the prompts, select a prompt and/or enter data utilizing the keypad and/or the alphanumeric keyboard, as shown in FIG. 1b.

At 402, after selecting "New" from the prompt at 400, a user is prompted to "Enter Group Number" or equivalent. If the user entry is invalid (e.g., group number is unavailable, entry is not within a predetermined group of numbers, etc.), an informational message is displayed and the "Enter Group Number" prompt is again displayed. If the entry is valid, at 404, a prompt to "Enter Group Name" (or equivalent) is displayed. If the user entry is invalid, an informational message is displayed and the "Enter Group Number" prompt is again displayed. If the user entry is valid, a "To:" prompt is displayed.

At 406, the "To:" prompt is employed to elicit one or more destination email addresses. Such email address can be entered utilizing one or more means such as an address book, keyboard entry, etc. At 408, an "Another Address" prompt is displayed. In one aspect, a user can select one of a "Done" or "Add" prompt to indicate whether one or more additional addresses are desired to be entered. In another aspect, the "Add" prompt can be unavailable if a particular predetermined condition exists (e.g., a maximum number of recipients have been reached, etc.).

Reference numeral 410 illustrates a prompt employed to delete one or more mail groups. After a user has selected "Delete," at 412, a prompt to "Enter Group Number" is displayed wherein a user is asked to enter a group number. If the entry is invalid, an informational message is displayed and the "Enter Group Number" prompt is again displayed. If the entry is valid, at 414, a "Delete Group [#]?" prompt or, at 416, a "Delete [group name] Group?" can appear. In one approach, if there is no group name selected and/or assigned to a particular mail group, the "Delete Group #" prompt will be displayed. A user can select one of "Yes" or "No" at 414 or 416 to indicate deletion of a group mail from memory.

At 418, a user can edit one or more mail groups. After a user has selected "Edit," at 420, a prompt to "Enter Group Number" is displayed wherein a user is asked to enter a group number. If the entry is invalid, an informational message is displayed and the "Enter Group Number" prompt is again displayed. If the entry is valid, at 422, the group name that corresponds to the group number entered is displayed and list of options is presented to a user. This list can include renaming the mail group and/or the addition, deletion or editing of members of the mail group.

At reference numeral 424, after "Edit Name" has been selected by a user, a "New Name:" prompt is displayed with an editable field containing the current group mail name. A user can employ a keypad and/or alphanumeric keyboard, as illustrated in FIG. 1b, to enter a group mail name. At 426, a user can select an "Edit Members" prompt in order to modify the number of members and/or view the members currently in the mail group.

Figure 21:
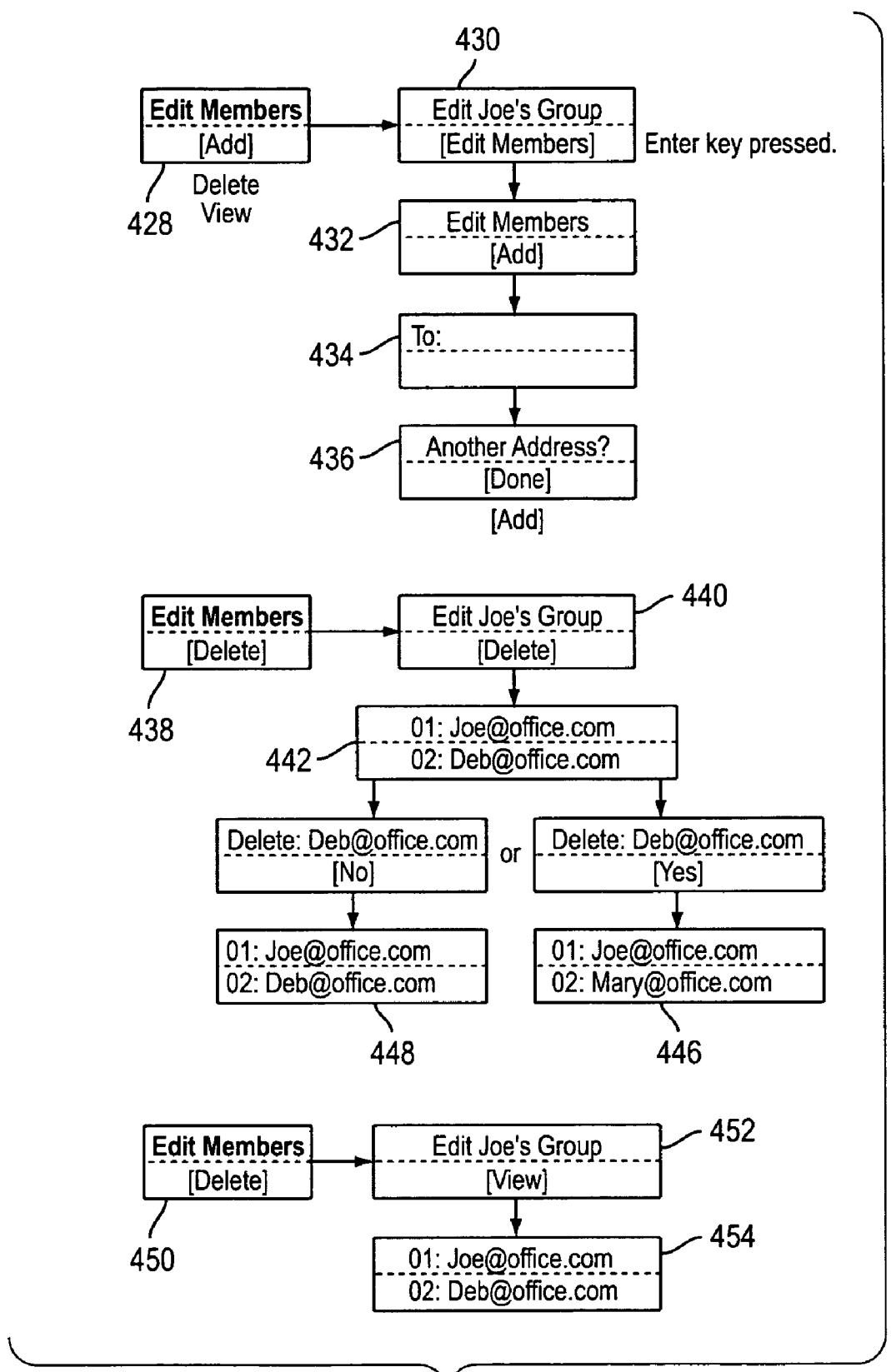
FIG. 21 illustrates a methodology that employs a series of prompts that allow a user to modify the number of members and/or view members in one or more mail groups.

FIG. 21 illustrates a methodology that employs a series of prompts that allow a user to modify the number of members and/or view members in one or more mail groups. Reference numeral 428 shows the "Add," "Delete," and "View" options available to a user to edit one or members of a mail group. Once "Edit Members" is selected at 430, an "Add" prompt can be employed to add one or more members to the mail group, at 432. At 434, a member can be added via a "To:" field by utilizing a keypad and/or alphanumeric keypad, as noted above. At 436, an "Another Address?" field is displayed wherein a user can select "Add" to add another member to the mail group. Such additional member can be entered utilizing an address book, manual entry, etc.

Reference numeral 438 shows a "Delete" prompt that a user can select to delete one or more mail group members. At 440, after a user selects the "Delete" prompt, a listing of a mail group's members is displayed. Such list can be provided in substantially any configuration such as a 2-line display, as illustrated. In this configuration, a user can employ keys to manually scroll through a listing of mail group members. In addition, the member can be listed by their email address and/or one or more aliases.

At 444, after a member has been selected, a "Delete [user name]?" prompt is displayed to allow a user to determine if a member will be deleted from a mail group. A "Yes" and "No" prompt can be displayed, wherein "Yes" is selected to delete the member and "No" is selected to prevent deletion of the member from the mail group. At 446, if "Yes" is selected, the member list is updated and displayed without the deleted member. At 448, if "No" is selected, the member list is again displayed with the member included.

Reference numeral 450 shows a "View" prompt that allows a user to display all the members of a particular mail group. At 452, the "View" prompt is selected via a keyboard and/or other manual entry means. At 454, the one or more members of a mail group are displayed. If the display limits the number of members viewable at a time, a user can employ scrolling, panning, etc. to view the entire member listing.

Figure 22:
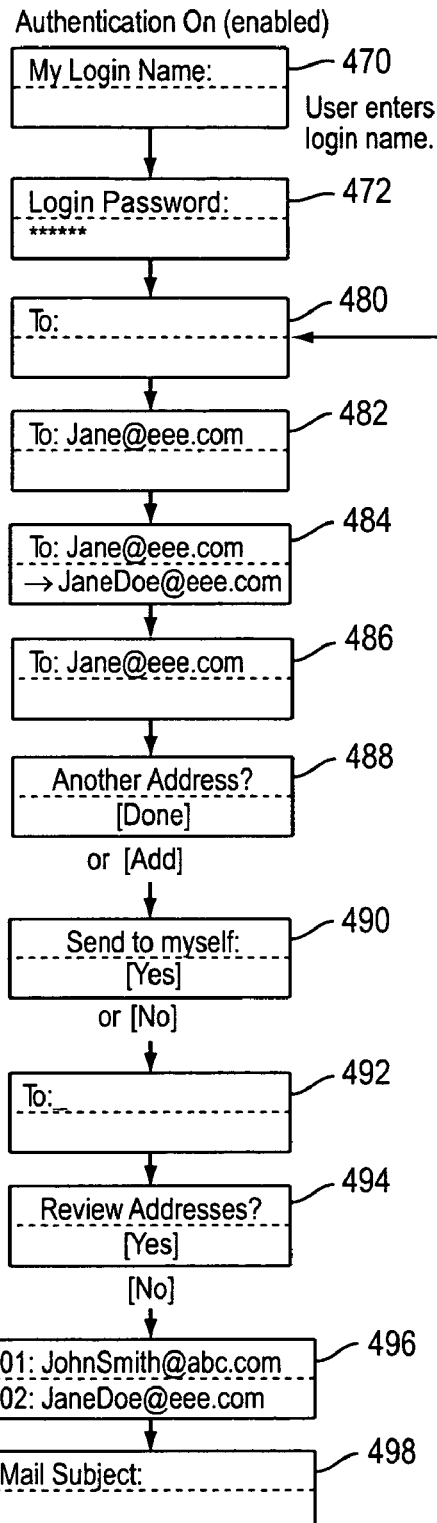
FIG. 22 illustrates a methodology that employs a series of prompts to provide a "wizard like" presentation of email functionality to a user.

The methodology illustrated in FIG. 22 provides an advantage over conventional systems by setting up locally on a multifunction device a creation of groups which hold a defined number of email addresses, which occupy only one space on a non-touch screen display (e.g., 2-line LCD). Such groups can be created by a user at the device and/or by the system administrator at their connected client via web browser. Such a configuration is beneficial in that any user can create and access a local group accessible by the user. Such local configuration is in contrast to conventional global groups which can be accessed by all users on a system.

FIG. 22 illustrates a methodology that employs a series of prompts to provide a "wizard like" presentation of email functionality to a user. Such methodology can be employed with one or more components such as the MFD 12 and the MFD 82. The email functionality can be employed with an authentication function enabled or with the authentication function disabled. In one approach, the authentication function can require a user to enter a login name and password in order to access one or more functions of one or more components. In one example, the email functionality can be employed to send one or more scanned documents in a desired format to one or more recipients.

Reference numeral 470 illustrates a "My login name:" prompt wherein the authentication function is enabled. A user enters a preprogrammed login name when the "My login name:" prompt is displayed. Such entry can occur via an alphanumeric keyboard, keypad, etc. After a login name is entered, a user can indicate that such entry is complete by pressing an "Enter" key or equivalent. Once the login name entry is complete, at 472, a "Login password:" prompt is displayed. A user enters a valid passcode that corresponds to the login name previously entered.

Reference numeral 474 illustrates a "From:" prompt wherein the authentication function is disabled. A user can enter a valid email address manually via a keyboard, keypad, etc. or by selection from an address book. At 476, a user can browse one or more email addresses associated with the address book. In one example, a user can scroll through the one or more email addresses such that an alias appears in the "From:" field and an email address associated with the alias appears below the name in the "From:" field. Once a desired email address is located a user can select the email address by pressing an "Enter" key or equivalent. At 478, once selected, the desired email address can replace the alias in the "From:" field.

Whether the authentication function is enabled or disabled, a prompt is displayed at 480 that contains a "To:" field. At 482, a user can manually enter one or more valid email addresses in the "To:" field. Such email addresses can be entered via an alphanumeric keyboard, keypad, touch screen, etc. Alternatively or in addition, email addresses can be entered via an address book, wherein one or more aliases and associated email addresses are stored. At 484, a user can scroll through the one or more names in the address book and select desired email addresses to place into the "To:" field. At 486, once the email address is selected, it appears in place of the alias in the "To:" field.

At 488, an "Another Address?" prompt is displayed to inquire whether a user would like to enter another address. Below the "Another Address?" prompt is a field that can be toggled between "Done" and "Add." If the user selects "Add," the prompt at 480 will be displayed. A user can continue to enter additional email addresses in by following the above procedure until a predetermined number of addresses are reached. If such predetermined number is reached, the "Add" field will not be available to a user, and the "Done" field will be selected.

Once "Done" is selected, a "Send to Myself?" prompt is displayed at 490 to allow a user to send an email sent to one or more recipients to themselves. Under the "Send to Myself?" prompt, a user can select from a "Yes" or "No" prompt. If a user selects "Yes," and the authentication function is enabled, a user can enter their own email address at 492 and press an "Enter" key or equivalent to indicate entry is complete. Alternatively, an auto send to self function can be enabled wherein each email sent to one or more recipients is automatically sent to the sender.

If a user selects "No" at 494, a "Review Addresses?" prompt is displayed. A "Yes" and "No" field can be located adjacent to the "Review Addresses?" prompt wherein a user can indicate their preference. If a user selects "Yes," the screen can display all addresses to which the email will be sent. At 496, a prompt is shown wherein a user can scroll through the one or more email recipients. If a user wishes to delete one or more recipients from the address list, a "Clear" key or equivalent can be pressed when the desired email is selected. Once a user is complete reviewing addresses, an "Enter" key or equivalent can be pressed to exit the "review Addresses" function.

At 498, a "Mail Subject:" prompt is displayed wherein a user can enter a subject for the subject field in an email. Such entry can be made manually utilizing keys, touch screen, etc. After entry is complete, a user can press "Enter" or an equivalent. At 500, a "Select File Type:" prompt is displayed to allow a user to select a desired file type in which to scan and transmit a document via email. A field can appear adjacent to the "Select File Type" prompt that contains one or more file types such as .pdf, .tiff, .jpg, etc. The user can then scroll through the file types and select a desired file type for document scanning and transmission.

At 502, after a user has selected a desired file type, a "Press Start to Send" prompt is displayed to instruct a user to press a "Start" key to initiate scanning one or more documents to prepare for sending via email. It is to be appreciated that although a "Start" key is illustrated, substantially any key can be displayed and employed to initiate scanning of one or more documents. At 504, one or status states is displayed such as "Scanning . . . ," "Sending Mail . . . ," and "Send Successful," etc. In this manner, a user is informed of the progress of the device and can be notified when an email is successfully transmitted to one or more recipients.

If the authentication function is enabled, at 506, a prompt "Log Off Now?" is displayed that allows a user to log off the email functionality. This prompt can be displayed after an indication that a successful transmission has occurred (e.g., "Send Successful," etc.). A field containing a "Yes" and a "No" field can be toggled and selected by a user to indicate whether they would like to log off. If a user selects "Yes," at 508, a "My Login Name:" prompt can be displayed to allow a user to enter a valid username to login. Alternatively, at 510, if the authentication function is not enabled, a "From:" prompt can be displayed after notification of a successful email transmission.

While the foregoing description has primarily discussed configuring the email functionality of a multifunction device, the described devices and methods may be used for applications other than multifunction devices, such as for use with any device capable of receiving data and communicating such data to one or more recipients. Thus, the foregoing is not limited to multifunction devices.

In addition, the text employed with each prompt displayed to a user is for illustrative purposes only. Similar and/or equivalent text can employed instead of or in addition to the text shown. It is to be appreciated that any prompts that allow a user to utilize this methodology are contemplated.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claim is:

1. A multifunction communication system, comprising:
a scanner that scans and receives data scanned from one or more images on a medium;
a multifunction device that processes data received from the scanner, comprising:
a user interface that allows a user to enter commands to configure at least one functional aspect of the multifunction device, wherein the user is presented with a logical progression of prompts that inquire of user information that is needed to complete an email function, said user interface further including a customizable special key for accessing a list of at least one of commonly used email addresses, portions of email addresses, and user-specific email addresses;
an authentication component that communicates with the user interface that requires the user to enter a valid username and password associated with a particular user account via the user interface to access the specific functionality of the multifunction device, wherein said particular user account has a particular security level designating at least one of email and functionality capabilities; and
an email component that facilitates sending one or more email messages that contain data received from the scanner, said email component having an auto-send to self feature, automatically sending a copy of each email message to the sender along with the selected recipients, wherein said logical progression of prompts is dependent on the enablement or disablement of authentication, said enablement or disablement disposed to determine the particular progression of prompts displayed to the user, and wherein upon enablement of authentication, said username and password are associated with said particular user account including a particular set of data specific to the particular user account, including at least one of user-specific address book, a user-specific group list and a user-specific default subject line;
a timing device that designates a period of time before the user is automatically logged off the account, said timing device capable of utilizing messaging prompts that require the user to make an active decision to log off or remain authenticated, wherein said timing device is configured to interface with said authentication component to establish said designated periods of time;
a processing component that is separate from and communicates with the multifunction device, interfaces with one or more peripheral devices and runs one or more applications employed to communicate with the multifunction device; and
a receiving component that receives at least one email message from the multifunction device, wherein said particular set of data is stored on at least one of said processing component and said multifunction device.

2. The system according to claim 1, further including:
an address book component that locally stores at least one group, wherein the group comprises at least one name and an associated email address.

3. The system according to claim 2, further including:
a remote application that interfaces to the address book component to at least one of add, delete, edit, print or store addresses for subsequent retrieval.

4. The system according to claim 1, wherein the functional aspect of the multifunction device is one of fax, email, scan and copy.

5. The system according to claim 1, wherein the user will be required indicate that the user wishes to remain logged in after each predetermined event occurs.

6. The system according to claim 1, wherein at least one functional aspect of the multifunction device can be configured remotely via a computer application.

7. The system of claim 1, wherein said customizable special key further allows the user to at least one of access and select a text string, automatically populate the "From:" field in an email message and automatically populate the "To:" field in an email message.

8. The system of claim 1, wherein the email component automatically sends an email of scanned data to a predetermined email address.

9. The system according to claim 1, further including an SMTP server that accepts data from the multifunction device and transmits the received data to the receiving element.

10. The system according to claim 9, further including a software application employed to configure at least one aspect of the SMTP server.

11. The system according to claim 9, wherein communication with the SMTP server requires authentication utilizing one of Kerberos, Secure Sockets Layer, Message-Digest algorithm 5, NTLM and Authenticated Post Office Protocol.

12. A computer-based xerographic method for sending email via a multifunction machine, comprising:
entering a login name and a login password into a processor, wherein said processor:
authenticates the login name and password in an authentication component, said authentication provides access to the specific functionality of the multifunction device;
provides a user interface that allows the user to enter commands to configure at least one aspect of the multifunction machine, wherein the user interface presents into a logical progression of prompts that inquire into user information that is needed to complete an email function;

provides a customizable special key for accessing a list of at least one of commonly used email addresses, portions of email addresses, and user-specific email addresses;

initiates scanning of a document;

sends scan automatically to user's email address upon completion of document scan, wherein said logical progression of steps depends on the enablement or disablement of user authentication, said enablement or disablement disposed to determine the particular progression of prompts displayed to the user, wherein upon enablement of authentication, said username and password are associated with a particular user account including a particular set of data specific to the user, including at least one of a user-specific address book, a user-specific group list and a user-specific default subject line; and designating a period of time before said user is automatically logged off the account using a timing device, said timing device capable of utilizing messaging prompts that require the user to make an active decision to log off or remain authenticated, wherein said timing device is configured to interface with said authentication component to establish a designated period of time.

13. The method according to 12, wherein the scanning can be initiated at substantially any step within the method.

14. A computer-based method for sending email of a scanned document via a multifunction machine, comprising:
a processor for:
providing an authentication component for authenticating a login name and password;
providing a user interface that allows a user to enter commands to configure at least one aspect of the multifunction machine, wherein said user interface presents a logical progression of prompts that inquire of user information that is needed to complete an email function, said user interface further includes a customizable special key for accessing a list of at least one of commonly used email addresses, portions of email addresses, and user-specific email addresses;
populating the "From:" field with an email address;
populating the "To:" field with the email address of the "From:" field;
pressing the Start key to initiate scanning of a document;
verifying the validity of the email in the "From:" field;
scanning the document;
sending an email of the document to the address in the "To:" field and to the user's email address upon completion of document scan, wherein said logical progression of prompts depends on the enablement or disablement of user authentication, said enablement or disablement disposed to determine the particular progression of prompts displayed to the user, wherein upon enablement of authentication, said username and password are associated with a particular user account including a particular set of data specific to the user, including at least one of user-specific address book, a user-specific group list and a user-specific default subject line; and
providing messaging prompts to the user using a timing device that require an active decision to log off or remain authenticated, wherein the machine automatically logs off if no response is received within a particular time designation determined by said timing device.

15. The method according to claim 14, further including:
populating the "To:" field utilizing one of an address book, a customizable .com key, manual entry via an alphanumeric keypad, selecting via a prompt to send to self, and automatically via an auto send to self feature.

16. The method according to claim 14, further including:
populating the "From:" field utilizing one of authentication to automatically populate the field, manually via alphanumeric keyboard, utilizing a preset default value, selection from an address book and via a customizable .com key.

* * * * *